(12) United States Patent
Daulton

(10) Patent No.: US 11,050,917 B2
(45) Date of Patent: *Jun. 29, 2021

(54) DETACHABLE MINI-CAMERA DEVICE

(71) Applicant: Brian Anthony Daulton, Coalinga, CA (US)

(72) Inventor: Brian Anthony Daulton, Coalinga, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/702,220

(22) Filed: Dec. 3, 2019

(65) Prior Publication Data

US 2020/0106946 A1    Apr. 2, 2020

Related U.S. Application Data

(63) Continuation of application No. 16/194,042, filed on Nov. 16, 2018, now Pat. No. 10,530,982.

(Continued)

(51) Int. Cl.
*H04N 5/232* (2006.01)
*H04N 5/225* (2006.01)
(Continued)

(52) U.S. Cl.
CPC ........... *H04N 5/23203* (2013.01); *G01S 3/00* (2013.01); *G06F 1/1686* (2013.01);
(Continued)

(58) Field of Classification Search
CPC ........... H04N 5/2252; H04N 5/232645; H04N 5/23212; H04N 5/23216; H04N 5/2628; H04N 5/2254; H04N 5/23203; H04N 5/2256; H04N 5/232945; H04N 5/23299; H04N 5/23218; H04N 5/232933; H04N 5/23241; H04N 5/23296; H04N 5/247;
(Continued)

(56) References Cited

U.S. PATENT DOCUMENTS

| 7,957,765 | B1 * | 6/2011 | Causey | H04M 1/00 |
| | | | | 455/575.1 |
| 10,579,108 | B2 * | 3/2020 | DiLaura | G06F 1/16 |
| | | | | 455/575.1 |

(Continued)

FOREIGN PATENT DOCUMENTS

| CN | 202043207 U | * 11/2011 |
| CN | 202043207 U | 11/2011 |

*Primary Examiner* — Marly S Camargo
(74) *Attorney, Agent, or Firm* — Procopio, Cory, Hargreaves & Savitch LLP

(57) ABSTRACT

Integrated but detachable mini-camera for a mobile device. The mobile device comprises a main body and a detachable mini-camera configured to attach to and detach from a socket in the main body. The detachable mini-camera may comprise at least one camera and a rechargeable battery configured to, while the detached mini-camera is attached to the main body, charge from a battery in the main body via the socket. While the detachable mini-camera is detached from the main body, a wireless transceiver in the detachable mini-camera wirelessly communicates with a wireless transceiver in the main body, and a mobile application, executed by a processor in the main body, controls the detachable mini-camera and receives image data from the detachable mini-camera via the wireless communication.

18 Claims, 9 Drawing Sheets

Related U.S. Application Data

(60) Provisional application No. 62/608,788, filed on Dec. 21, 2017.

(51) Int. Cl.

| | |
|---|---|
| *H04N 5/247* | (2006.01) |
| *H04M 1/02* | (2006.01) |
| *G01S 3/00* | (2006.01) |
| *H04M 1/72* | (2021.01) |
| *G06F 1/16* | (2006.01) |
| *H04M 1/72415* | (2021.01) |
| *G06F 3/0482* | (2013.01) |
| *G06F 3/0488* | (2013.01) |
| *H04M 1/72412* | (2021.01) |

(52) U.S. Cl.
CPC ........ *H04M 1/0256* (2013.01); *H04M 1/0264* (2013.01); *H04M 1/72415* (2021.01); *H04N 5/2254* (2013.01); *H04N 5/2256* (2013.01); *H04N 5/232* (2013.01); *H04N 5/23216* (2013.01); *H04N 5/23218* (2018.08); *H04N 5/23219* (2013.01); *H04N 5/23241* (2013.01); *H04N 5/23296* (2013.01); *H04N 5/23299* (2018.08); *H04N 5/232933* (2018.08); *H04N 5/232945* (2018.08); *H04N 5/247* (2013.01); *G06F 3/0482* (2013.01); *G06F 3/0488* (2013.01); *H04M 1/72412* (2021.01)

(58) Field of Classification Search
CPC ..... G06F 3/0488; G06F 11/686; G02B 13/00; G02B 13/001; G01S 3/00; H04M 1/0264; H04M 1/0254; H04M 2250/00; H04M 2250/20; H04M 12/00; H04M 1/72415; H04M 1/72416
USPC ..... 348/211.2, 211.1, 211.99, 211.12, 224.1, 348/158, 376, 14.02, 231.7, 333.06, 348/333.07, 207.11; 455/41.1–41.2, 455/575.1

See application file for complete search history.

(56) References Cited

U.S. PATENT DOCUMENTS

| | | |
|---|---|---|
| 2007/0273752 A1 | 11/2007 | Chambers |
| 2008/0064437 A1 | 3/2008 | Chambers |
| 2010/0208434 A1 | 8/2010 | Yu |
| 2011/0212717 A1 | 9/2011 | Rhoads |
| 2011/0254964 A1 | 10/2011 | Zhang |
| 2016/0006920 A1 | 1/2016 | Motta |
| 2017/0272112 A1* | 9/2017 | DiLaura ............... H04B 1/3888 455/575.1 |
| 2018/0063407 A1 | 3/2018 | Torikai |
| 2018/0077272 A1* | 3/2018 | Sainvil ................ H04N 5/2253 455/575.1 |
| 2018/0188635 A1* | 7/2018 | Wang ............... H04N 5/225251 348/374 |
| 2019/0250487 A1 | 8/2019 | Barros |

\* cited by examiner

DETACHABLE MINI-CAMERA DEVICE

CROSS-REFERENCE TO RELATED APPLICATIONS

This application is a continuation of U.S. patent application Ser. No. 16/194,042, filed on Nov. 16, 2018, which claims priority to U.S. Provisional Patent App. No. 62/608,788, filed on Dec. 21, 2017, which are both hereby incorporated herein by reference as if set forth in full.

BACKGROUND

Field of the Invention

The embodiments described herein are generally directed to a camera, and, more particularly, to an integrated mini-camera device that can be detached from and attached to the main body of a larger device, such as a smartphone or other mobile computing device.

Description of the Related Art

Many, if not most, mobile devices these days are outfitted with one or more built-in or embedded cameras. Examples of such mobile devices include, without limitation, cellular or other wireless telephones (e.g., smartphones), tablet personal computers (PCs), laptop PCs, wearable devices (e.g., smart watches) and any other type of mobile (e.g., wireless) user equipment. Typically, the built-in camera is a small-complementary-metal-oxide-semiconductor (CMOS) based or charge-coupled-device (CCD) based image sensor that comprises associated control components and electronics.

A user of the mobile device can use the built-in camera to capture high-resolution digital photographs and videos, similarly to a traditional digital camera. For a rear-facing camera in which the components (e.g., camera, flash, and sensor) are on the rear side of the mobile device, the user typically faces the rear side of the mobile device towards the object of interest and actuates a control on the mobile device (e.g., virtual button within a graphical user interface displayed on a front display of the mobile device, hard key on the front or side of the mobile device, etc.) to capture a photograph or video of the object. The mobile device then stores the photograph or video as a digital image file (e.g., a Joint Photographic Experts Group (JPEG) file) in a memory of the mobile device.

Generally, the user can utilize software on the mobile device to organize, edit, transmit, and/or share the captured digital photograph or video files. For example, the digital file may be transmitted via a wireless communications network (e.g., cellular network, Wi-Fi™ network, etc.) to a cloud-computing service, to another device (e.g., associated with another user or the same user), and/or the like. In the case of a video, the user may conduct a video conference (e.g., via FaceTime™, Skype™, or other application). Alternatively, the user may live-stream a video to an online service (e.g., social media platform, such as Facebook™) via the wireless communication network. Other users may then view the live-stream of the video via a data connection with the online service. As another alternative, one user could live-stream a video directly from his or her mobile device to another user's device.

Since the inception of the camera phone in 1997, users have become increasingly comfortable using the built-in cameras of their mobile devices as a primary camera for photographs and video, in place of traditional stand-alone handheld cameras. Thus, manufacturers have begun designing their mobile devices to enhance the quality, usability, and functionality of the built-in cameras. However, built-in cameras remain difficult to use in conjunction with other functions of the mobile devices.

For example, when the need arises to use the built-in camera to capture a photograph or video while a user is engaged in a telephone conversation using the mobile device, the user must generally interrupt the telephone conversation to position the mobile device for the capture. Specifically, the user may need to switch the telephone conversation to speakerphone, in order to enable appropriate positioning of the mobile device for photograph or video capture. In addition, the user must maintain the mobile device within a comfortable range of the user's ears and mouth, in order to continue the telephone conversation while attempting to capture a photograph or video. It also results in a loss of privacy, since both sides of the conversation may be heard by passerby's. In addition, the user may need to navigate to a camera function of the mobile device (e.g., using a touch panel display of the mobile device) in order to initiate the capture of the photograph or video.

What is needed is an integrated but detachable mini-camera that can be detached from the main body of a mobile device and used to capture photographs and video without regard for the orientation of the main body. Ideally, the mini-camera could be reattached to the main body of the mobile device for recharging and compact, integrated storage of the mini-camera.

SUMMARY

Accordingly, a mini-camera is disclosed that is capable of quick and easy undocking and docking with a main body of a mobile device. In an embodiment, a mobile device is disclosed that comprises: a main body comprising a battery, a first wireless transceiver, a socket, at least one hardware processor, a memory, and a mobile application stored in the memory; and a detachable mini-camera configured to attach to the socket and detach from the socket, wherein the detachable mini-camera comprises at least one camera, a rechargeable battery configured to charge from the battery in the main body when the detachable mini-camera is attached to the socket, and a second wireless transceiver configured to wirelessly communicate with the first wireless transceiver in the main body when the detachable mini-camera is detached from the socket; wherein the mobile application is configured to, when executed by the at least one hardware processor in the main body, when the detachable mini-camera is detached from the socket, wirelessly communicate with the detachable mini-camera, via the first and second wireless transceivers, to control the detachable mini-camera and receive image data captured by the detachable mini-camera. The detachable mini-camera may further comprise at least one sensor and at least one flash. The main body may further comprise: a front surface comprising a touch panel display; and a rear surface comprising the socket, wherein the rear surface is on an opposite side of the main body as the front surface. The at least one camera may consist of a single camera configured to capture photographs and video, or may comprise a first camera dedicated to capturing photographs and a second camera dedicated to capturing video (e.g., comprising a plurality of image frames).

The at least one camera may comprise: a mini-camera device; and at least one motor powered by the rechargeable battery in the detachable mini-camera and configured to rotate the mini-camera within a range of rotation around at least one axis. The at least one camera may further comprise a rod, wherein the at least one motor comprises a ball-and-axis motor that is attached to a first end of the rod, wherein the mini-camera device is attached to a second end of the rod that is opposite to the first end, and wherein the ball-and-axis motor is configured to, when activated, rotate the rod, so as to rotate the mini-camera within the range of rotation around a first axis that is coincident with a longitudinal axis of the rod. Additionally or alternatively, the mini-camera device may comprise an imaging face on a front side and a motor on a rear side, opposite the imaging face, wherein the motor is configured to rotate the imaging face within a range of rotation around a second axis that is orthogonal to the longitudinal axis of the rod.

In an embodiment, the mobile application is configured to: generate a graphical user interface that comprises one or more inputs for moving the mini-camera device; and, in response to receiving a user operation of at least one of the one or more inputs, transmit a control command from the first wireless transceiver in the main body to the second wireless transceiver in the detachable mini-camera, so as to actuate the at least one motor to rotate the mini-camera device in accordance with the control command. The mobile application may be further configured to: generate a graphical user interface that comprises one or more inputs for specifying an object in a photograph; and, when an object is specified, generate a reference representation of the object, and during a subsequent video recording or live stream in which the mobile application receives a plurality of image frames from the detachable mini-camera, detect the object in one or more of the plurality of image frames, and, in response to detecting the object, transmit a control command from the first wireless transceiver in the main body to the second wireless transceiver in the detachable mini-camera, so as to actuate the at least one motor to rotate the mini-camera device to track the object.

In an embodiment, the mobile application is configured to: generate a graphical user interface that comprises a real-time-view region and at least one input for one or more of capturing a photograph, initiating a video recording, and initiating a live stream, wherein the real-time-view region comprises real-time image data captured by the detachable mini-camera and wirelessly transmitted from the second wireless transceiver in the detachable mini-camera to the first wireless transceiver in the main body; and, in response to receiving a user operation of the at least one input, transmit a control command from the first wireless transceiver in the main body to the second wireless transceiver in the detachable mini-camera, so as to actuate the at least one camera in the detachable mini-camera according to the control command. The mobile application may be configured to, when the user operation of the at least one input is to capture a photograph: generate the control command to capture the photograph; receive the photograph from the detachable mini-camera via a wireless communication from the second wireless transceiver to the first wireless transceiver; and store the received photograph in the memory in the main body. The mobile application may be configured to, when the user operation of the at least one input is to initiate a video recording: generate the control command to initiate the video recording; during the video recording, receive a plurality of image frames from the detachable mini-camera via a wireless communication from the second wireless transceiver to the first wireless transceiver; and store the received plurality of image frames in the memory in the main body as a video file. The mobile application may be configured to, when the user operation of the at least one input is to initiate a live stream: generate the control command to initiate the live stream; and, during the live stream, receive a plurality of image frames from the detachable mini-camera via a wireless communication from the second wireless transceiver to the first wireless transceiver, and relay the plurality of image frames to a sharing platform via at least one wireless cellular network. In addition, the mobile application may be further configured to: generate a graphical user interface that comprises one or more inputs for identifying a group of one or more contacts; and, for each of the one or more contacts in the group, transmit an invitation to the contact, wherein the invitation comprises information for viewing the live stream. Alternatively or additionally, the mobile application may be further configured to generate a graphical user interface that comprises one or more inputs configured to receive a user selection of the sharing platform.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, a mini-camera is disclosed that is capable of quick and easy undocking and docking with a main body of a mobile device. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Detachable Mini-Camera

Figures 1A, 1B:
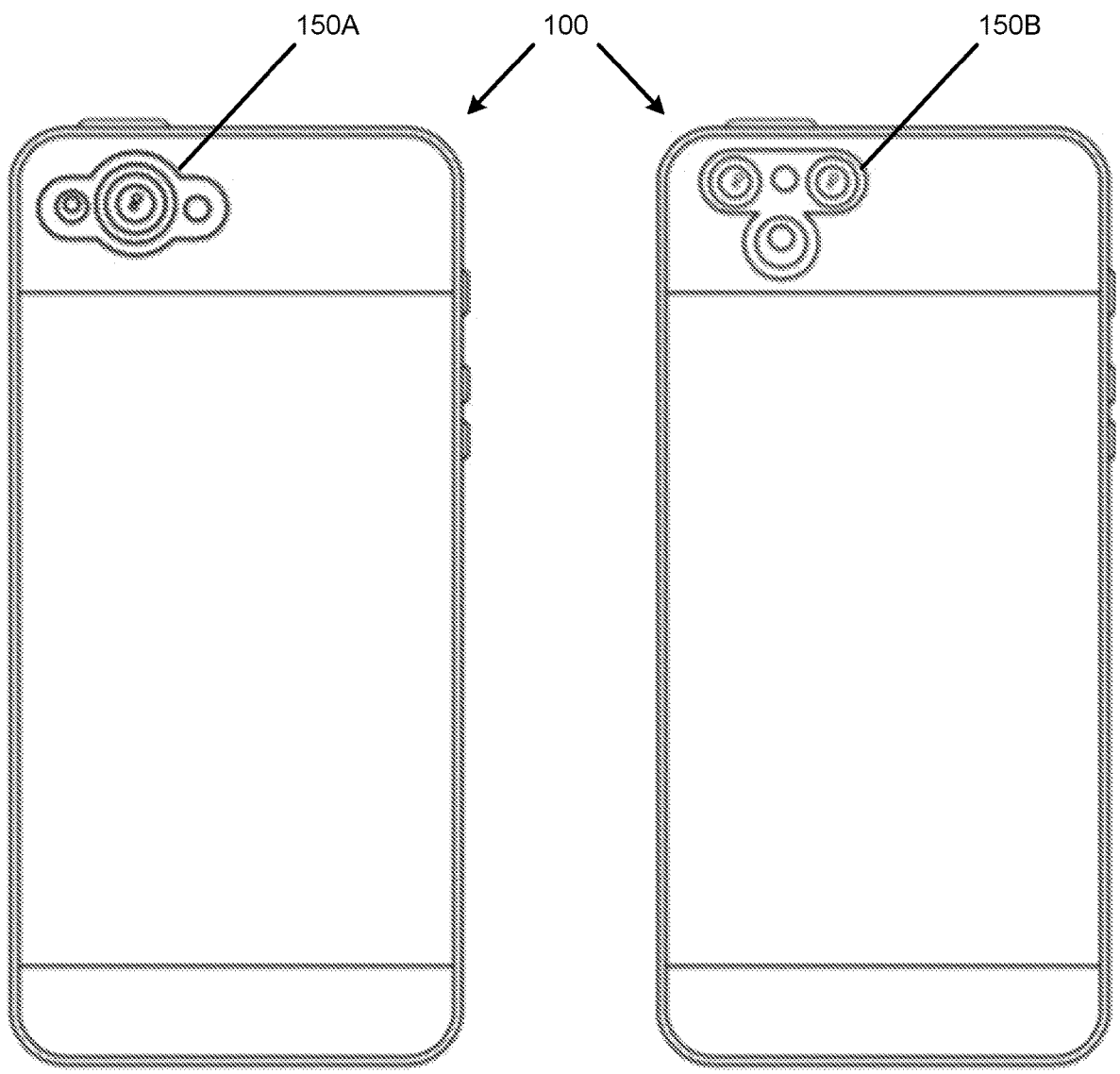
FIGS. 1A-1C illustrate an example mobile device with a detachable mini-camera, according to embodiments.

FIG. 1A illustrates an example mobile device with a detachable mini-camera of a first embodiment in an attached state (e.g., docked state), whereas FIG. 1B illustrates an example mobile device with a detachable mini-camera of a second embodiment in the attached state. Mobile device 100 is illustrated as a smartphone. However, mobile device 100 may comprise any type of mobile computing device, including a smartphone, tablet PC, laptop PC, and/or the like, which may comprise or benefit from an integrated camera. Typically, mobile device 100 will utilize wireless communications, such as cellular communications (e.g., via a Long Term Evolution (LTE) network) and/or Wi-Fi™ communications, to communicate with other devices over one or more wireless and/or wired, public and/or private networks, including, for instance, the Internet.

Mobile device 100 comprises a detachable mini-camera 150. While attached to mobile device, detachable mini-camera 150 may act in the same manner as any built-in camera. As illustrated, in the attached state, detachable mini-camera 150 is a rear-facing camera that is attached to the rear surface of mobile device 100. The rear surface is, for example, a surface that is on an opposite side of mobile device 100 as a display and/or inputs (e.g., a touch panel display) of mobile device 100. Alternatively or in addition to a detachable mini-camera 150 on the rear surface, mobile device 100 may comprise a detachable mini-camera 150 attached to the front surface of mobile device 100 (e.g., on the same surface as the display of mobile device 100). When attached to mobile device 100, detachable mini-camera 150 may be rear-facing (e.g., when attached to the rear surface of mobile device 100, or alternatively through the rear surface while attached via the front surface) or front-facing (e.g., when attached to the front surface of mobile device 100, or alternatively through the front surface while attached via the rear surface). As another alternative, detachable mini-camera 150 could comprise both rear and front surfaces of mobile device 100 (e.g., an entire detachable corner of mobile device 100, detachable top of mobile device 100, detachable side of mobile device 100, etc.).

Figure 1C:
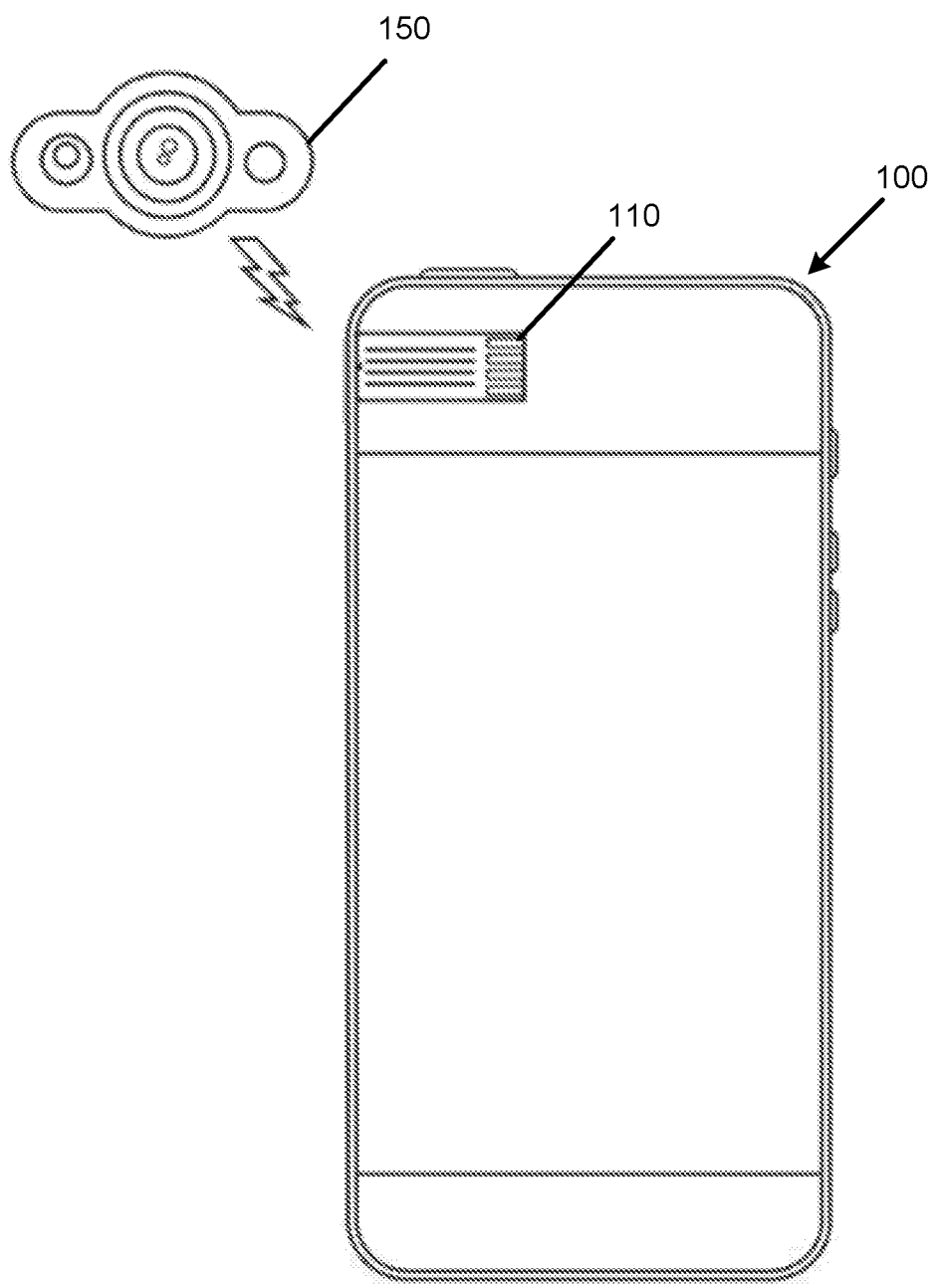

FIG. 1C illustrates an example mobile device with a detachable mini-camera in a detached state (e.g., undocked state), according to an embodiment. Specifically, detachable mini-camera 150 has been detached from mobile device 100, exposing a socket 110 within the surface of mobile device 100. Socket 110 may comprise grooves, hooks, magnets, and/or other attachment components that detachably engage with corresponding attachment components on detachable mini-camera 150 (e.g., on the rear surface of detachable mini-camera 150), such that detachable mini-camera 150 can be easily and intuitively detached from socket 100 and attached to socket 100. In addition, socket 110 may comprise one or more electrical traces or other connectors that conductively couple with one or more corresponding electrical traces or other connectors on detachable mini-camera 150 (e.g., on the rear surface of detachable mini-camera 150) while the attachment components are engaged to attach detachable mini-camera 150 to mobile device 100. Again, while the rear surface of mobile device 100 is illustrated, alternatively or additionally, socket 110 may be formed in the front surface of mobile device 100 or another surface of mobile device 100. Furthermore, while detachable mini-camera 150A of the first embodiment is illustrated in FIG. 1C, the illustrated socket 110 can be used with or adapted for detachable mini-camera 150B of the second embodiment or any other embodiment of detachable mini-camera 150.

In the detached state, illustrated in FIG. 1C, detachable mini-camera 150 acts as a stand-alone camera that wirelessly communicates with mobile device 100. Specifically, detachable mini-camera 150 may comprise a transmitter that wirelessly transmits signals, encoding data, to a receiver in the main body of mobile device 100. For example, while detached from mobile device 100, detachable mini-camera 150 may wirelessly transmit captured image data (e.g., photographs, video recordings, live streams, etc.) to mobile device 100 (e.g., for storage, viewing, or other processing at mobile device 100), in real time as the image data is captured. As used herein, the noun "real time" and the adjective "real-time" refer to instances of both real time and near-real time (e.g., within milliseconds or a second from actual real time as determined by processing latency, network latency, and/or other communication latency). In addition, detachable mini-camera 150 may comprise a receiver that wirelessly receives signals from a transmitter of mobile device 100. In an embodiment, the detachable mini-camera 150 and/or mobile device 100 may comprise a transceiver that comprises both the transmitter and the receiver. Any wireless technology may be used for the wireless communication between detachable mini-camera 150 and mobile device 100, including, without limitation, Bluetooth™ Zigbee™, and/or the like.

In an embodiment, socket 110 comprises one or more electrical connectors that supply power to detachable mini-camera 150 in the attached state. Accordingly, detachable mini-camera 150 may comprise a rechargeable battery that, in the attached state in which detachable mini-camera 150 is attached to mobile device 100 via socket 110, is charged from a battery or other power supply of mobile device 100 via the electrical connectors in socket 110.

In an embodiment, socket 110 also comprises one or more electrical connectors that convey communication signals between detachable mini-camera 150 and mobile device 100. These electrical connector(s) may be the same as or different than the electrical connector(s) that supply power to detachable mini-camera 150. Thus, in the attached state, illustrated in FIGS. 1A and 1B, detachable mini-camera 150 may communicate with mobile device 100 via one or more direct electrical connections to socket 110. Alternatively, detachable mini-camera 150 could wirelessly communicate with mobile device 100 even in the attached state, in the same or similar manner as in the detached state. However, such an embodiment would likely result in higher battery consumption due to the operation of the wireless transceivers in both the detached and attached states.

Figure 2A:
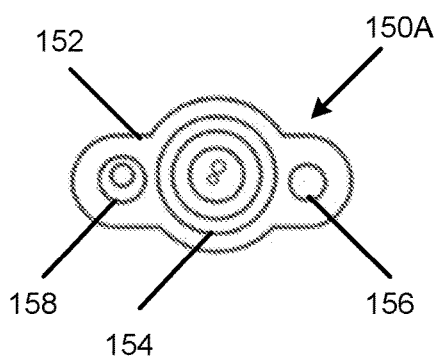
FIGS. 2A and 2B illustrate a detachable mini-camera, according to embodiments.
Figure 2A:
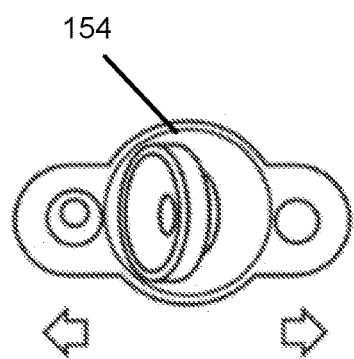
Figure 2A:
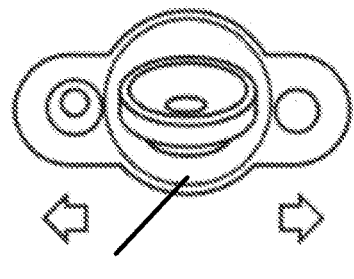
Figure 2B:
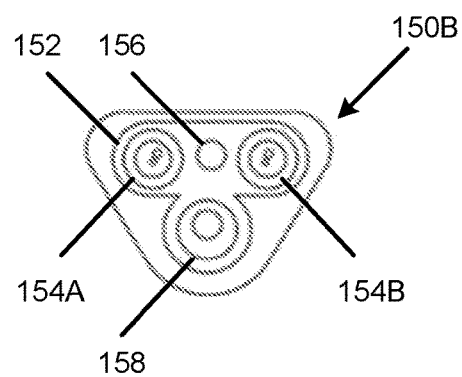
Figure 2B:
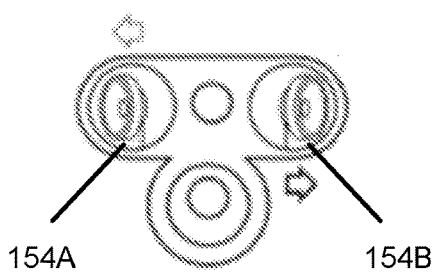
Figure 2B:
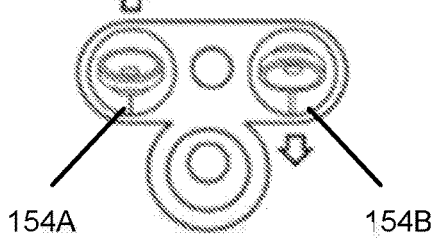

FIG. 2A illustrates the components of detachable mini-camera 150A of the first embodiment illustrated in FIG. 1A, whereas FIG. 2B illustrates the components of detachable mini-camera 150B of the second embodiment illustrated in FIG. 1B. Generally, detachable mini-camera 150 comprises a housing 152 configured to house one or more cameras 154, one or more sensors 156, and/or one or more flashes 158, as well as their associated or auxiliary electronic components.

In the first embodiment, illustrated in FIG. 2A, detachable mini-camera 150A comprises one camera 154, one sensor 156, and one flash 158. This first embodiment corresponds more closely to traditional mobile cameras, with a single camera 154 positioned in the center of detachable mini-camera 150A, a single sensor 156 positioned on a first side of camera 154 (e.g., illustrated on the right side), and a single flash 158 positioned on a second side of camera 154 that is opposite to the first side (e.g., illustrated on the left side). Camera 154 may be capable of capturing both photographs and video recordings.

In the second embodiment, illustrated in FIG. 2B, detachable mini-camera 150B comprises two cameras 154A and 154B, one sensor 156, and one flash 158. In this second embodiment of detachable mini-camera 150B, cameras 154A and 154B may be identical or different in structure and/or function, and may operate independently from each other and/or in unison with each other. As one example, camera 154A may be a photographic camera dedicated to capturing photographs, whereas camera 154B is a video camera dedicated to capturing video (e.g., comprising a plurality of image frames). In the illustrated embodiment, sensor 156 is positioned equidistant between camera 154A and camera 154B, and flash 158 is positioned below sensor 156 and equidistant from camera 154A and camera 154B. However, other arrangements are possible.

In an embodiment, each camera 154 is capable of moving with respect to one or more axes. For example, as illustrated in FIGS. 2A and 2B, each camera 154 is capable of rotating around both an X-axis and a Y-axis. Alternatively, each camera may only be capable of rotating around one axis (e.g., the Y-axis) or may be fixed (i.e., not capable of rotation or other movement). In an embodiment in which camera 154 rotates, housing 152 may comprise, for each camera 154, an opening or recess which is configured to receive camera 154 while allowing camera 154 to rotate around the one or more axes without the camera's field of view being blocked by any portion of housing 152. Alternatively or additionally, the angle of rotation of camera 154 may be limited such that the camera's field of view will never be blocked by any portion of housing 152.

In an embodiment, sensor 156 is a separate component that is inset within an opening or recess of housing 152. Sensor 156 may comprise a sensor for detecting luminance, movement, proximity, and/or the like. Output from sensor 156 may be used to determine controls for camera(s) 154, flash 158, and/or other components of detachable mini-camera 150.

In an embodiment, flash 158 provides a flash or pulse of light for lighting the environment while an image or video is being captured by camera 154. Flash 158 may be controlled automatically by a mobile application executing on mobile device 100 and/or manually by a user of the mobile application. For example, a user may specify a specific flash mode within a graphical user interface of the mobile application, such as "automatic", "on", "off", "indoor", "outdoor", and/or the like. In the "automatic" mode, the mobile application may automatically utilize flash 158 when sensor 156 detects a low level of luminance (e.g., indicating a dark environment), while not utilizing flash 158 when sensor 156 detects a high level of luminance (e.g., indicating a bright environment). The mobile application could also automatically determine and utilize flash 158 at a plurality of different brightness levels depending on the level of luminance (e.g., higher brightness levels for lower levels of luminance, and lower brightness levels or no flash for higher levels of luminance). In the "on" mode, the mobile application may always utilize flash 158, regardless of any output from sensor 156 indicating a luminance of the environment. In the "off" mode, the mobile application may never utilize flash 158, regardless of any output from sensor 156 indicating a luminance of the environment. In the "indoor" mode, the mobile application may utilize flash 158, as in the "automatic" mode (i.e., depending on the luminance of the environment detected by sensor 156), but using a low-light flash level (i.e., less light than in the "outdoor" mode). In the "outdoor" mode, the mobile application may utilize flash 158, as in the "automatic" mode (i.e., depending on the luminance of the environment detected by sensor 156), but using a bright-light flash level (i.e., more light than in the "indoor" mode).

In an embodiment, housing 152 of detachable mini-camera 150 (e.g., 150A and/or 150B) may comprise one or more fastening mechanisms, configured to attach detachable mini-camera 150 to socket 110 of mobile device 100, as well as other objects (i.e., objects other than mobile device 100). For example, housing 152 may comprise a spring-loaded clip or clasp that is capable of being press-opened and biased by a spring to snap closed around an object. The object in this case may comprise clothing (e.g., the collar, pocket, or lapel of a shirt of jacket, the waist of pants, a belt, etc.), accessories (e.g., purse, glasses, etc.), and/or anything else that can fit within the grasp of the clip. Additionally or alternatively, housing 152 may comprise other fastening mechanisms (e.g., magnets, Velcro™, snaps, loops, etc.).

Figure 3A:
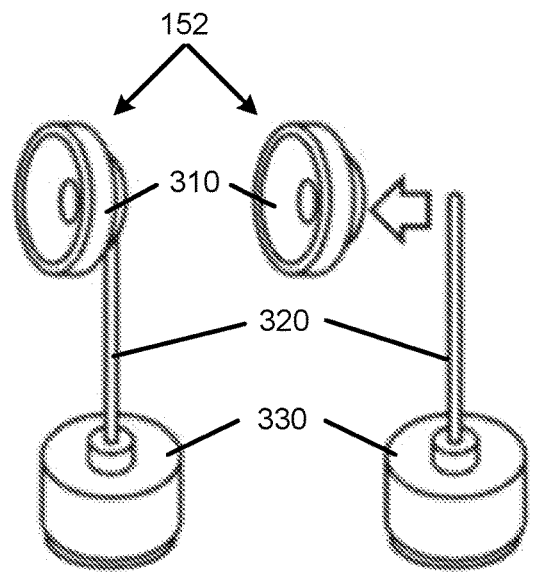
FIGS. 3A and 3B illustrate components of a detachable mini-camera, according to an embodiment.

FIG. 3A illustrates the components of camera 154, according to an embodiment. As illustrated, camera 154 comprises a mini-camera device 310 that is attached to a rod 320. Rod 320 is rotated by a ball-and-axis motor 330 that is powered, for example, by a rechargeable battery within housing 152 of detachable mini-camera 150.

In an embodiment, ball-and-axis motor 330 comprises an independent motor within a base (e.g., cylindrical or cubical base) that is fixed directly or indirectly to housing 152. The motor rotates or spins in either direction (e.g., clockwise and counterclockwise) around an axis that is coincident with the longitudinal axis of rod 320. The range of rotation of ball-and-axis motor 330 may be limited (e.g., to a fixed arc defined by an angle of rotation) to prevent full rotation.

In an embodiment, rod 320 is a long, thin, substantially cylindrical, but pin-shaped rod. Rod 320 may be positioned to extend along its longitudinal axis from a center of the base of ball-and-axis motor 330. Rod 320 may be fixed to ball-and-axis motor 330, such that it rotates with ball-and-axis motor 330, for example, within the same range of rotation as ball-and-axis motor 330.

In an embodiment, mini-camera device 310 is attached to rod 320 at or near an end of rod 320 that is opposite the end of rod 320 fixed to ball-and-axis motor 330. For example, mini-camera device 310 may be positioned on the tip of rod 320. In other words, one end of rod 320 is attached to ball-and-axis motor 330, and the other end of rod 320 is attached to mini-camera device 310. Thus, as ball-and-axis motor 330 rotates, rod 320 rotates due to its attachment to ball-and-axis motor 330, and this, in turn, causes mini-camera device 310 to rotate to the same degree as ball-and-axis motor 330 and rod 320. Consequently, if the range of rotation of ball-and-axis motor 330 and rod 320 are limited, the range of rotation of mini-camera device 310 is similarly limited.

In an embodiment, the range of rotation of the imaging face of mini-camera device 310 may comprise rotation in both a rotational direction around the longitudinal axis of rod 320 (e.g., axis Y in FIGS. 2A and 2B) as well as a rotational direction around an axis that is orthogonal to the longitudinal axis of rod 320 (e.g., axis X in FIGS. 2A and 2B). In other words, mini-camera device 310 may rotate left and right as well as up and down to reposition the camera face at any of a plurality of orientations within the range of rotation. For example, the backside of mini-camera device 310 may comprise a small motor, which, when activated, rotates the imaging face of mini-camera device 310 around the X axis that is orthogonal to the longitudinal Y axis of rod 320 (e.g., up and down with respect to the longitudinal Y axis of rod 320). In this manner, the range of rotation of imaging face of mini-camera device 310 may be nearly spherical or hemispherical (e.g., 180° around the longitudinal Y axis of rod 320 and 180° around the orthogonal X axis). An electrical connection (e.g., conductive trace, cable, etc.), for supplying power and/or control to the small motor, may be fed to the small motor through a hollow center of rod 320 and/or ball-and-axis motor 330, or alternatively may be external to rod 320 and/or ball-and-axis motor 330.

Figure 3B:
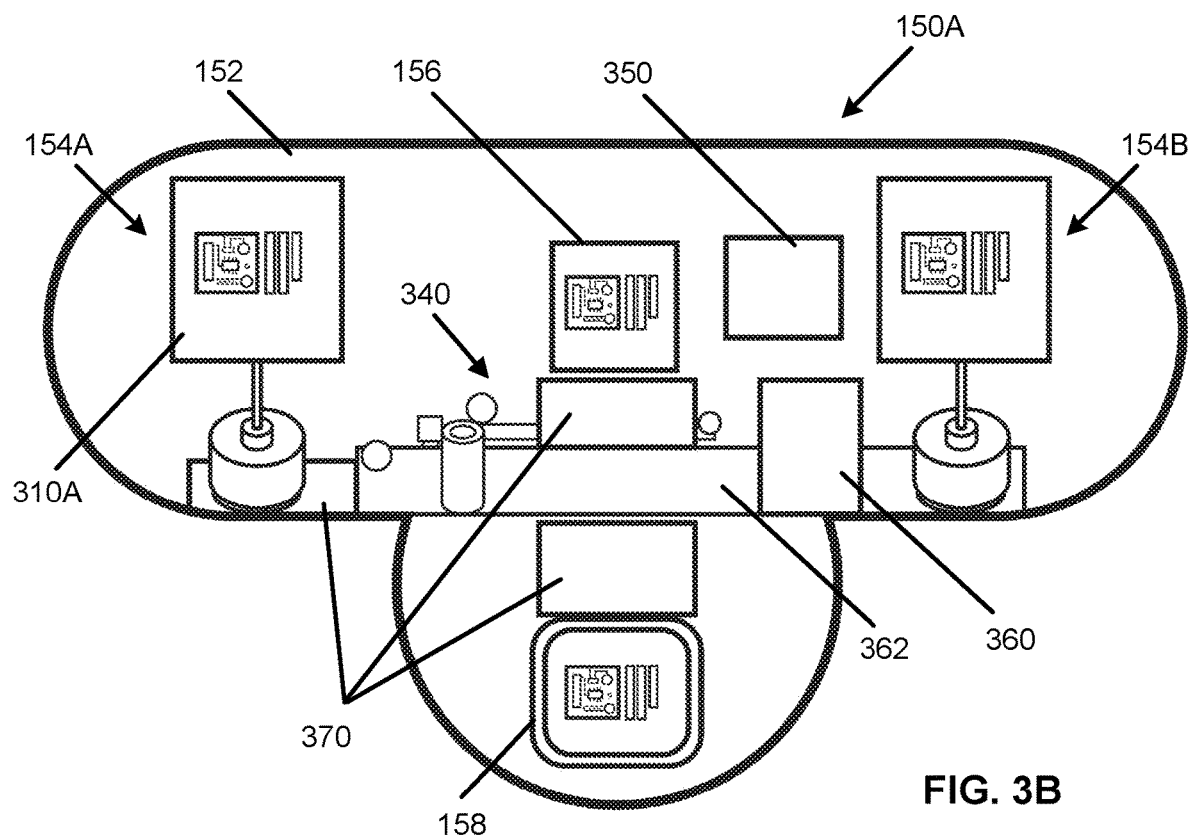

FIG. 3B illustrates the components of detachable mini-camera 150A, according to an embodiment. Detachable mini-camera 150B of the second embodiment may be implemented in a similar manner. Specifically, housing 152 comprises one or more internal and/or external recesses that are configured to receive one or more cameras 154, one or more sensors 156, one or more flashes 158, an electronics bed 340, one or more rechargeable batteries 350, one or more transceivers 360, and/or their associated or auxiliary components. During the manufacturing process, each component may be inserted into its corresponding recess, directly or indirectly fixed to housing 152, and conductively connected to other components via electrical connectors (e.g., 370) within housing 152 (e.g., within electronics bed 340). In addition, each of the camera(s) 154, sensor(s) 156, flash(es) 158, and/or transceiver(s) 360, may be conductively connected to rechargeable battery 350 (e.g., via electronics bed 340) so as to be powered by rechargeable battery 350, at least when detachable mini-camera 150 is in the detached state.

In an embodiment, electronics bed 340 comprises a thin substrate of strengthened material to which the electronic components of detachable mini-camera 150 are attached. The electronic components may also be electrically coupled via electronics bed 340 (e.g., via cables and/or electrical traces and/or other connectors within electronics bed 340). Electronics bed 340 is affixed to and/or otherwise seated within housing 152.

In an embodiment, rechargeable battery 350 comprises a lithium-ion battery (e.g., a micro 1A lithium-ion battery), which is seated in electronics bed 340 and charged by a charging module. The charging module may comprise one or more electrically conductive traces that, in the attached state, conductively contact a corresponding number of electrically conductive traces in socket 110 of mobile device 100, which are, in turn, conductively coupled to a battery of mobile device 100. Thus, when detachable mini-camera 150 is attached to mobile device 100 via socket 110, power is supplied from the battery of mobile device 100 to the electrically conductive traces of socket 110, and through the conductive contact, to the electrically conductive traces of the charging module, which relay the power to rechargeable battery 350, so as to charge rechargeable battery 350. Then, when detachable mini-camera 150 is detached from mobile device 100, rechargeable battery 350 is discharged to power the components of detachable mini-camera 150. Additionally or alternatively, the charging module may comprise a power socket (e.g., compliant with an industry standard, such as a Universal Serial Bus (USB) port) configured to receive power via an end of a power cable. In this case, rechargeable battery 350 may be charged from any power supply to which the other end of the power cable is attached (e.g., wall outlet, mobile backup battery, other electronic device, etc.).

In an embodiment, transceiver 360 is conductively coupled to electronics bed 340 and powered by rechargeable battery 340. Transceiver 360 may comprise a Bluetooth™ transceiver (e.g., a mini slave wireless Bluetooth™ 4.0 or 5.0 transceiver), which is capable of pairing with a Bluetooth™-capable transceiver of another device, such as mobile device 100. Bluetooth™ 5.0 supports a wireless communication range of 50-100 feet. However, wireless technologies, other than Bluetooth™ and/or with different wireless communication ranges can be used, and transceiver 360 may be capable of wireless communication using a plurality of different technologies (e.g., including Bluetooth™, Wi-Fi™, Zigbee™, and/or the like), using a plurality of frequency bands, and/or within a plurality of different wireless communication ranges.

In an embodiment, transceiver 360 is electrically coupled to a flex cable antenna 362, which is used transmit wireless signals, representing data (e.g., image data captured by mini-camera device(s) 310), to a wireless receiver in mobile device 100, and/or receive wireless signals, representing data (e.g., control commands generated by mobile device 100), from a wireless transmitter in mobile device 100. Transceiver 360 may also be capable of receiving signals from Global Positioning System (GPS) satellites via flex cable antenna 362, for the purposes of determining a location of detachable mini-camera 150. For example, flex cable antenna 362 may comprise a Bluetooth™-GPS-Wi-Fi™ flex cable antenna that is capable of communicating via Bluetooth™ and Wi-Fi™ and receive GPS signals. Regardless of the specific wireless technology or technologies used, transceiver 360 may comprise an encoder configured to encode data (e.g., image data from camera 154) into a radio signal to be transmitted via flex cable antenna 362, and a decoder configured to decode data from a radio signal that has been received via flex cable antenna 362. The main body of mobile device 100 may comprise an identical, similar, or different transceiver having the same capabilities.

In an embodiment, once detachable mini-camera 150 is detached from socket 110 in mobile device 100, transceiver 360 automatically pairs (e.g., via Bluetooth™) with a transceiver in mobile device 100 to begin wireless communication with mobile device 100. Conversely, once detachable mini-camera 150 is attached to socket 110 in mobile device 100, transceiver 360 may automatically un-pair with the transceiver in mobile device 100 to end wireless communication with mobile device 100 (e.g., to reduce power consumption). Alternatively, detachable mini-camera 150 may always remain paired with the transceiver in mobile device 100 to perform wireless communication with mobile device 100, regardless of whether or not it is attached or detached from socket 110 (e.g., at the cost of increased power consumption). In either case, the wireless communication may comprise transceiver 360 transmitting data (e.g., image data, status data, etc.), collected by detachable mini-camera 150, to mobile device 100 (e.g., for processing by the mobile application described elsewhere herein), and receiving data (e.g., control commands, configuration data, etc.) from mobile device 100 (e.g., generated by the mobile application executing on mobile device 100).

In an embodiment, various components of detachable mini-camera 150 are electrically connected to each other within electronics bed 340 via one or more electrically conductive substrates or cables. For example, electronics bed 340 may comprise one or more flex cables 370 that couple to each camera 154, sensor 156, and/or flash 158. Each flex cable 370 may comprise a thin strip of fibrous and conductive material that supplies power (e.g., by relaying power from rechargeable battery 350) to camera, 154, sensor 156, and/or flash 158. In addition, flex cable(s) 370 may transmit control signals to camera 154, sensor 156, and/or flash 158 and/or receive signals from camera 154, sensor 156, and/or flash 158. For instance, in an embodiment, camera 154 may receive control signals, provide an output (e.g., image data), and receive power (e.g., to power ball-and-axis motor 330) via a first flex cable, sensor 156 may provide a sensor output and receive power via a second flex cable 370, and flash 158 may receive control signals (e.g., specifying when and/or how bright to flash) and receive power (e.g., to be converted into a pulse of light) via a third flex cable 370.

In an embodiment, detachable mini-camera 150 may also comprise one or more processors (not shown). Each processor may comprise a central processing unit (CPU) that communicates with one or more of camera(s) 154, sensor(s) 156, flash(es) 158, and/or transceiver(s) 360 via one or more electrical connections (e.g., flex cables) on electronics bed 240. The processor may receive messages from the connected components, process the information in the messages, and/or control the connected components based on processed information. For example, the processor may receive control information (e.g., comprising control commands and/or configuration information), received and decoded by transceiver 360, and/or sensor output from sensor 156, and control one or more cameras 154 and/or flash 158 based on the control information. The control of a camera 154 may comprise moving the face of mini-camera device 310 by activating ball-and-axis motor 330, capturing a photograph and/or video, setting an exposure time during image capture (e.g., photograph and/or video capture), and/or controlling any other function or setting of camera 154. The control of flash 158 may comprise setting a light level, activating the flash to trigger a pulse of light (e.g., according to a set brightness level) during image capture, preventing activation of the flash in a low-light setting (e.g., as detected by sensor 156), and/or the like.

2. Mobile Application

In an embodiment, a mobile application is provided. The mobile application may be pre-installed on mobile device 100, for example, by the original equipment manufacturer (OEM). Additionally or alternatively, the mobile application may be a stand-alone application that is downloadable from an application store or other network site (e.g., website) for one or more operating systems (e.g., iOS™, Android™, Microsoft Windows™, etc.).

The mobile application may be stored and executed by a processor of mobile device 100 to control the functions and/or settings of detachable mini-camera 150. For example, the mobile application may generate a graphical user interface comprising one or more screens that each comprise one or more inputs that enable a user to control various functions or settings of detachable mini-camera 150. The screens of the graphical user interface may be navigable in any known manner, for example, using virtual buttons, touch gestures (e.g., taps, long presses, swipes, flicks, pinch-ins, pinch-outs, etc.).

FIGS. 4A-4H illustrate one or more screens of a graphical user interface 400, generated by a mobile application executing on mobile device 100, according to an embodiment. Each screen may comprise one or more regions, implemented as frames and/or the like. Graphical user interface 400 may be displayed on a display of mobile device 100. In the illustrated embodiments, the display of mobile device 100 is integrated into a front surface of mobile device 100. It should be understood that, in these embodiments, socket 110, which receives detachable mini-camera 150, is either detached or attached on the opposite and rear surface of mobile device 100, and therefore, is not visible in FIGS. 4A-4H.

2.1. Main Screen

Figures 4A, 4B:
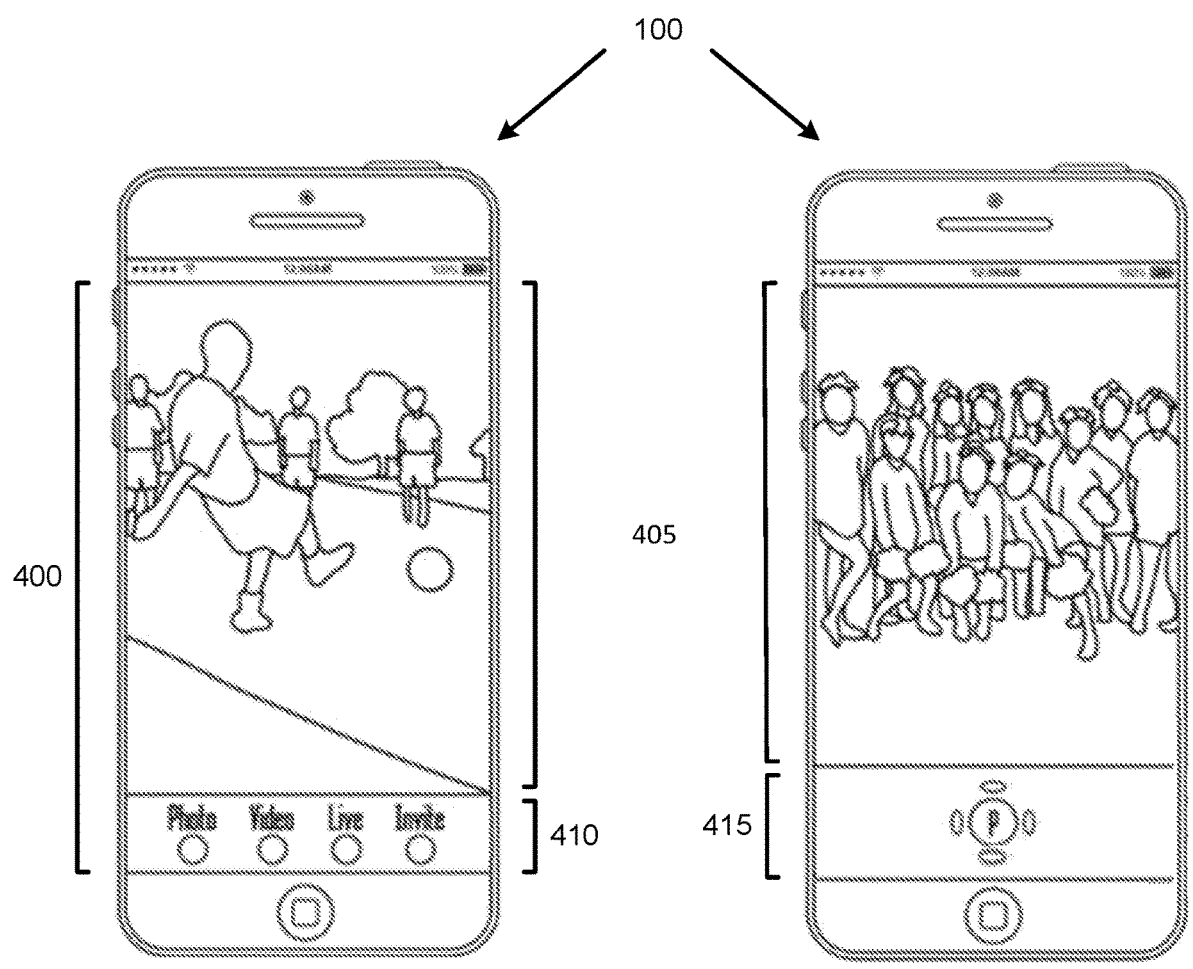
FIGS. 4A-4H illustrate various screens of an example graphical user interface of a mobile application for controlling a detachable mini-camera, according to an embodiment.

FIG. 4A illustrates a main screen (e.g., home or landing screen) of graphical user interface 400 of the mobile application, according to an embodiment. The main screen comprises a real-time-view region 405, which displays image data representing a real-time, optical field of view of camera 154 in detachable mini-camera 150. In the illustrated example, detachable mini-camera 150 may be detached from mobile device 100, in which case transceiver 360 is wirelessly transmitting the real-time optical field of view captured by camera 154 to mobile device 100, in real time. Alternatively, detachable mini-camera 150 may be attached to mobile device 100 via socket 110 on the rear surface of mobile device 100, in which case the real-time optical field of view captured by camera 154 may be non-wirelessly transferred from detachable mini-camera 150 to mobile device 100, in real time, via an electrical connection to socket 110. It should be understood that the entire graphical user interface 400 (e.g., illustrated in FIGS. 4A-4H) may be identical regardless of whether detachable mini-camera 150 is in the attached state or the detached state. In other words, graphical user interface 400 is no different when detachable mini-camera 150 is detached than when detachable mini-camera 150 is attached. However, an indication (e.g., icon and/or text) that detachable mini-camera 150 is detached may be displayed within graphical user interface 400 when detachable mini-camera 150 is detached and/or an indication (e.g., icon and/or text) that detachable mini-camera 150 is attached may be displayed within graphical user interface 400 when detachable mini-camera 150 is attached. Thus, advantageously, a user can easily determine whether the detachable mini-camera 150 is attached or detached without having to change the orientation of mobile device 100 or the user's perspective of mobile device 100 (e.g., in order to check the rear surface of mobile device 100). In addition, as discussed elsewhere herein, alerts and/or GPS tracking may be provided when detachable mini-camera 150 is attached, in order to reduce the likelihood that a detached mini-camera 150 is lost.

In an embodiment, the main screen also comprises an input region 410 (e.g., above or below real-time-view region 405). Input region 410 comprises one or more inputs for initiating a function of detachable mini-camera 150. For example, input region 410 may comprise inputs for initiating capture of a photograph, initiating a video recording, initiating a live stream (e.g., to a social media platform) of the image data being captured by detachable mini-camera 150, and/or inviting contact(s) to a group (e.g., for sharing a live stream).

2.2. Capturing Image Data

FIG. 4B illustrates a photograph screen of graphical user interface 400 of the mobile application, according to an embodiment. The photograph screen may be displayed when a user selects the input for initiating capture of a photograph in the main screen or other screen of graphical user interface 400. As illustrated, the photograph screen comprises real-time-view region 405. In addition, the photograph screen comprises an input region 415, which comprises one or more inputs for utilizing the photograph function of detachable mini-camera 150. For example, input region 415 may comprise inputs for zooming in (e.g., increasing a magnification of camera 154) and zooming out (e.g., decreasing a magnification of camera 154), inputs for rotating camera 154 in two or more directions (e.g., by activating a ball-and-axis motor 330 in camera 154), and/or an input for capturing a photograph. In the illustrated example, the input for capturing the photograph is a relatively large circular icon positioned in the center of input region 415 (e.g., with a "P" or other indication that detachable mini-camera 150 is in a mode for capturing photographs), with an input for zooming in above the circular icon, an input for zooming out below the circular icon, an input for rotating camera 154 to the left on the left side of the circular icon, and an input for rotating camera 154 to the right on the right side of the circular icon. Thus, a user can easily set the magnification and angle of camera 154 and capture a photograph at those settings. It should be understood that input region 415 could also comprise inputs for other settings, such as a flash setting, exposure setting, rotating or moving camera 154 in other directions (e.g., up and down), and/or the like.

Figure 4C:
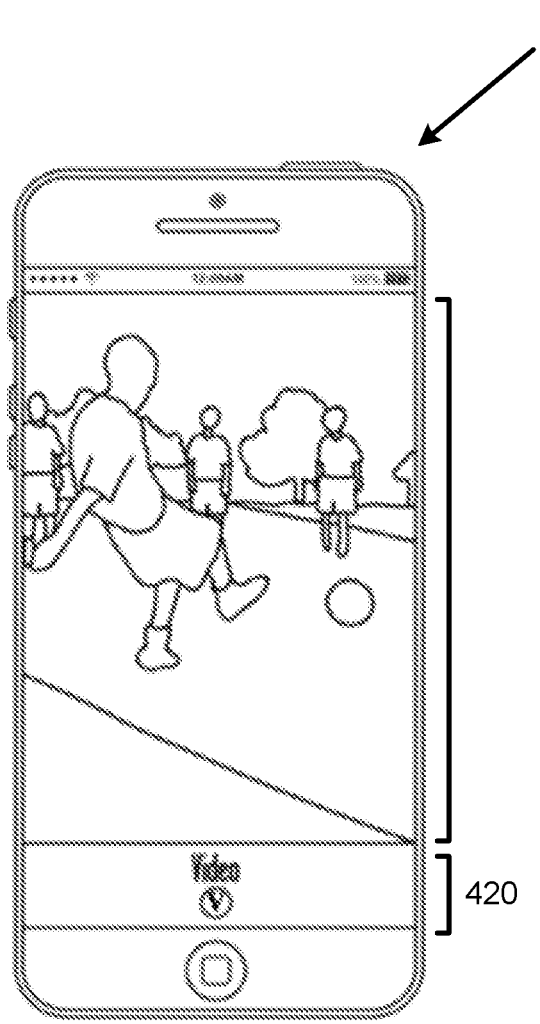

FIG. 4C illustrates a video screen of graphical user interface 400 of the mobile application, according to an embodiment. The video screen may be displayed when a user selects the input for initiating a video recording in the main screen or other screen of graphical user interface 400. As illustrated, the video screen comprises real-time-view region 405. In addition, the video screen comprises an input region 420, which comprises one or more inputs for utilizing the video recording function of detachable mini-camera 150. For example, input region 420 may comprise an input for starting and stopping a video recording. In the illustrated example, the input for starting and stopping a video recording is a circular icon positioned in the center of input region 420 (e.g., with a "V" or other indication that detachable mini-camera 150 is in a mode for capturing video recordings). When no video is currently being recorded, a user may select the input to start a new video recording. Then, while a video is being recorded, a user may select the same input to stop the new video recording. When the video recording is stopped, the video recording may be automatically saved into a memory of mobile device 100. It should be understood that the input may change depending on whether or not a video is currently being recorded (e.g., the color of the icon may change between gray and red, the shape of the icon may change, etc.).

During recording of a video, image frames may be transmitted from detachable mini-camera 150 to mobile device 100 in real time and stored in a memory of mobile device 100. Thus, when the video recording is stopped, the accumulated image frames may be stored in a video file on mobile device 100. Additionally, the image frames may be accumulated in a memory of detachable mini-camera 150. In this case, in an alternative embodiment, when the video recording is stopped, a processor of detachable mini-camera 150 may store the image frames in a video file and transmit the video file to mobile device 100 for storage.

Figure 4D:
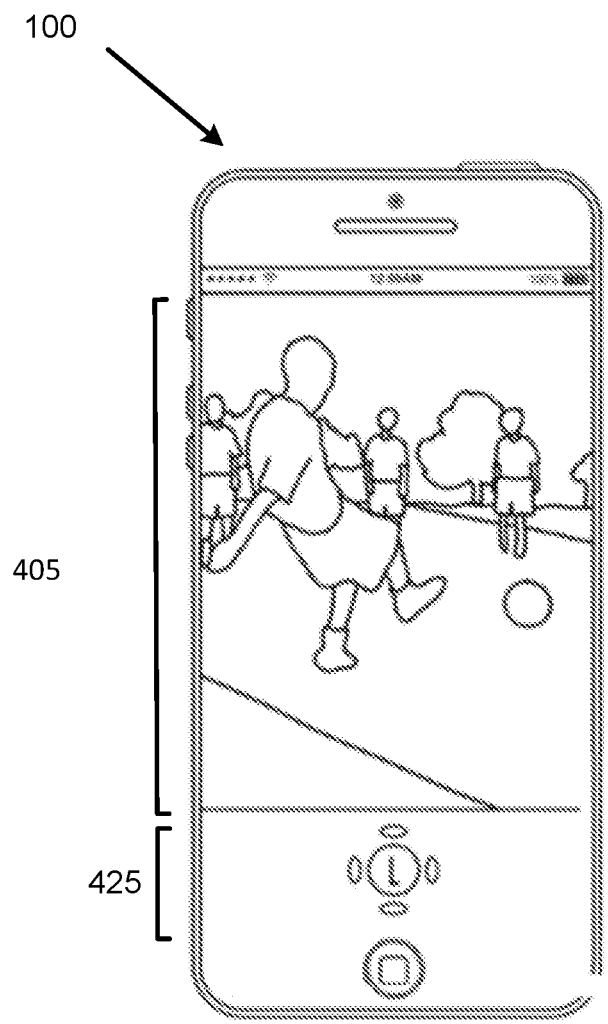

FIG. 4D illustrates a live-stream screen of graphical user interface 400 of the mobile application, according to an embodiment. The live-stream screen may be displayed when a user selects the input for initiating a live stream in the main screen or other screen of graphical user interface 400. As illustrated, the live-stream screen comprises real-time-view region 405. In addition, the live-stream screen comprises an input region 425, which comprises one or more inputs for utilizing the live-stream function of detachable mini-camera 150. For example, input region 425 may comprise an input for starting and stopping a live stream. In the illustrated example, the input for starting and stopping a live stream is a circular icon positioned in the center of input region 425 (e.g., with an "L" or other indication that detachable mini-camera 150 is in a mode for capturing a live stream). When no live stream is currently being captured, a user may select the input to start a new live stream. Then, while a live stream is being captured, a user may select the same input to stop the live stream. It should be understood that the input may change depending on whether or not a live stream is currently being captured (e.g., the color of the icon may change between gray and red, the shape of the icon may change, etc.). Additionally or alternatively, another indication (e.g., a green circle) may be displayed (e.g., in the far left of input region 425) while a live stream is being captured.

During a live stream, image frames may be transmitted from detachable mini-camera 150 to mobile device 100 in real time. In addition to continuously and sequentially displaying the image frames in real-time-view region 405, mobile device 100 may also relay the image frames, over one or more wireless networks (e.g., a cellular network providing access to the Internet), to another device (e.g., another mobile device) or to a social networking platform to be shared with other devices and/or saved through the social networking platform. In this manner, the image frames captured by detachable mini-camera 150 are relayed through mobile device 100 to another device or to a sharing platform.

While illustrated with respect to the live-stream screen in FIG. 4D, but not with respect to the video screen in FIG. 4C, both of these screens may comprise an input for zooming in (e.g., above the respective input for starting and stopping a video recording or live stream), an input for zooming out (e.g., below the respective input for starting and stopping a video recording or live stream), an input for rotating camera 154 to the left (e.g., on the left side of the respective input for starting and stopping a video recording or live stream), and an input for rotating camera 154 to the right (e.g., on the right side of the respective input for starting and stopping a video recording or live stream). Thus, a user can easily set the magnification and angle of camera 154 before and/or during a video recording and/or live stream. It should be understood that input regions 420 and/or 425 could also comprise inputs for other settings, such as a flash setting, exposure setting, rotating or moving camera 154 in other directions (e.g., up and down), and/or the like.

2.3. Sharing Groups

Figure 4E:
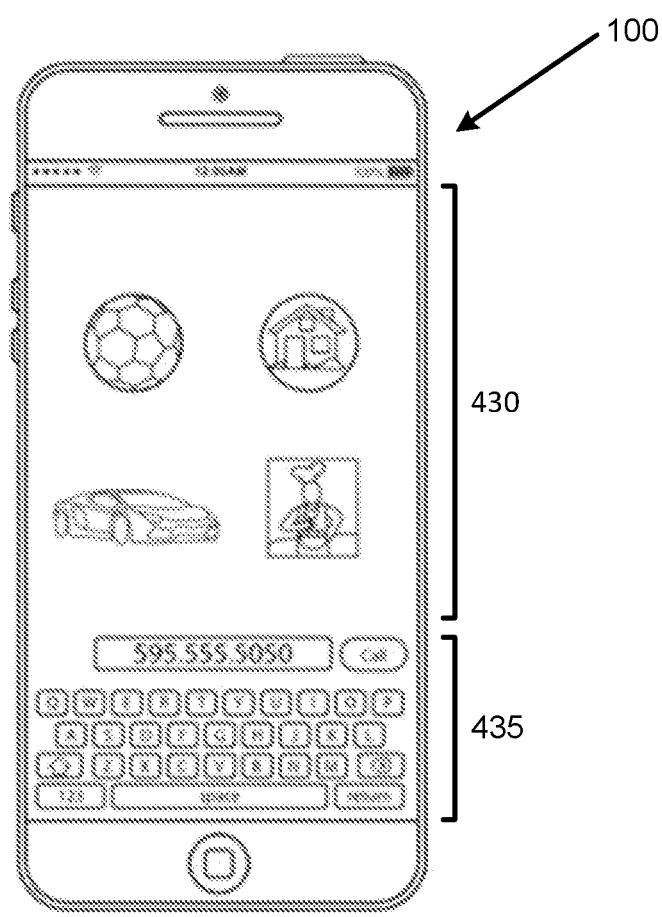

FIG. 4E illustrates a grouping screen of graphical user interface 400 of the mobile application, according to an embodiment. The grouping screen may be displayed when a user selects the input for inviting contact(s) to join a group in the main screen or other screen of graphical user interface 400. As illustrated, the grouping screen may comprise one or more inputs for creating groups of contacts for the purposes of sharing image data captured by detachable mini-camera 150 using the mobile application. A user may utilize the input(s) to create a group, name the group, and add or invite contacts to the group.

In the illustrated embodiment, the grouping screen comprises an icon-selection region 430 and an input region 435. Icon-selection region 430 comprises a plurality of selectable icons. The user can select one of the plurality of selectable icons (e.g., by tapping the icon in an embodiment which utilizes a touch panel display), and the selected icon will be assigned to the new group as a pictorial representation of the group. Input region 435 comprises a textbox, virtual keyboard, and/or other inputs for specifying a name of the group and identifying one or more contacts to be added or invited to the group. The contact(s) may be selected from a virtual address book stored in a memory of mobile device 100 or entered directly by the user. In an embodiment, mobile application sends an invitation for joining the group to each selected contact. For example, the invitation may be a Short Message Service (SMS) or Multimedia Messaging Service (MMS) message that is sent by a transmitter of mobile device 100, via one or more data networks, to a cellular number of a mobile device of each contact. The invitation may comprise a link or other element that, when selected by the invited contact, initiates a process of joining the group. Alternatively or additionally, the invitation may prompt the invited contact to reply to the message in order to accept and/or decline the invitation (e.g., using a specific keyword to accept the invitation and/or a specific keyword to decline the invitation). As examples, the user may utilize the grouping screen to create a "soccer" group for sharing a live stream of a child's soccer game, a "real estate" group for sharing a live stream of an open house that the user is attending, a "car" group for sharing a live stream of the user's car ride, a "cooking" group for sharing a live stream of the user cooking a food dish, and/or the like.

2.4. Object Tracking

Figure 4F:
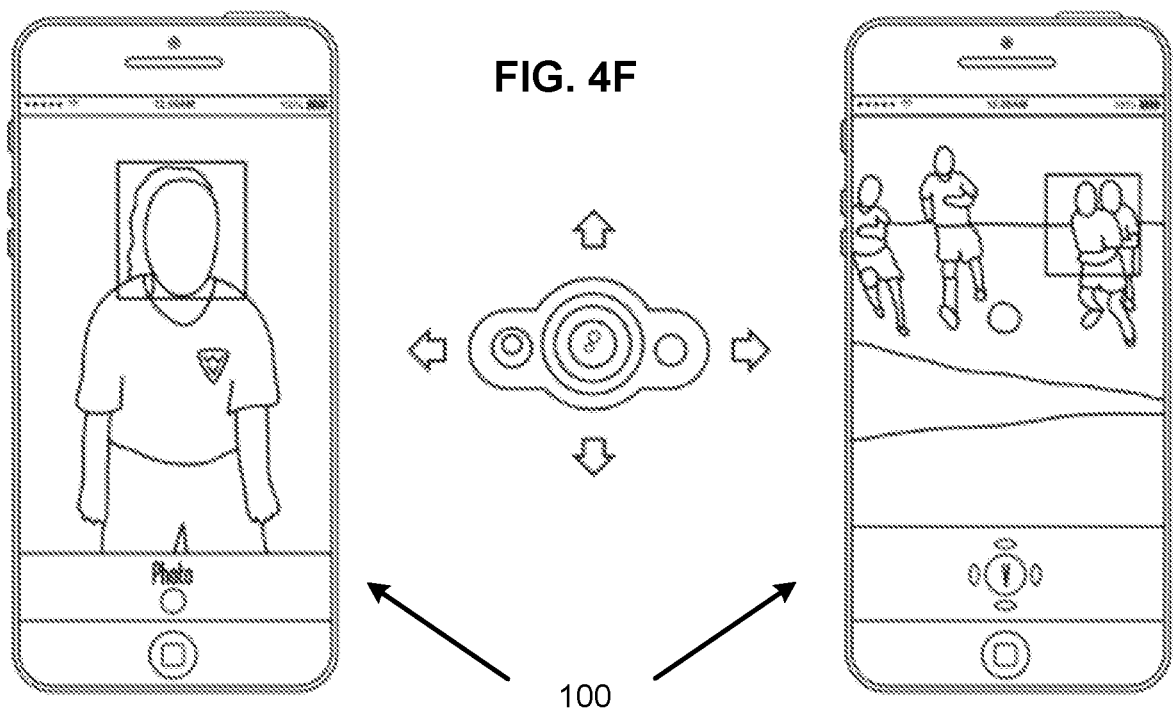

FIG. 4F illustrates a tracking function of the mobile application, according to an embodiment. First, the user may capture a photograph of an object using, for example, the photograph screen or a similar screen.

Second, an object to be tracked may be identified in the captured photograph. This identification may comprise the user moving or drawing a polygon (e.g., square) around the object of interest. Alternatively, the mobile application may automatically identify the object of interest, for example, using object detection (e.g., facial detection). In the illustrated example, the identified object of interest is the face of the user's daughter who is about to participate in a soccer game. Once the object of interest is identified, the mobile application may generate a representation of the object of interest that can be used for subsequent object detection. For instance, the representation of the object of interest may comprise a feature vector, which comprises a plurality of values that define a set of references features for the object of interest.

Third, once the object of interest has been identified and converted into a reference representation (e.g., a feature vector describing the object of interest), the mobile application may automatically control detachable mini-camera 150 to track the object of interest during a subsequent video recording and/or live stream, using real-time object detection and tracking within the image frames of the video recording or live stream. Specifically, detachable mini-camera 150 may capture a plurality of image frames and transmit the captured image frames to the mobile application on mobile device 100 in real time. The mobile application receives the captured image frames and performs object detection (e.g., facial recognition in the illustrated example) on each image frame, using the reference representation, as each image frame is received. The object of interest is detected whenever an object in the image frame matches the reference representation. When the object of interest is detected within an image frame, its position within the field of view of camera 154 may be determined and a degree of rotation and/or other distance of movement, required to center the object of interest within the field of view of camera 154, may be calculated. Then, the mobile application may transmit a control command to transceiver 360 in detachable mini-camera 150 that instructs the camera 154 to rotate according to the calculated degree of rotation and/or move according to the calculated distance of movement. Upon receiving the control command, a processor or other component in detachable mini-camera 150 may control ball-and-axis motor 330 to rotate or otherwise move mini-camera device 310 according to the calculated degree of rotation and/or distance of movement. In this manner, the mobile application controls camera 154 to continually center the object of interest within the field of view of camera 154.

Advantageously, this automated object tracking facilitates hands-free video recording or live streaming by detachable mini-camera 150. For instance, it is contemplated that a user could detach detachable mini-camera 150 from mobile device, and clip or otherwise fasten detachable mini-camera 150 to another object. As long as detached mini-camera 150 remains within a wireless communication range of mobile device 100, the mobile application may continue to control detached mini-camera 150 and record and/or stream image data captured by detached mini-camera 150. For example, the user could fasten detached mini-camera 150 to a relatively stationary object and continue to use his or her mobile device 100 (e.g., to make or receive telephone calls, send or receive text messages, browse the Internet, and/or perform any other conventional function of a mobile device), without having to worry about properly orienting or steadying mobile device 100 to capture the image data, or store his or her mobile device 100 (e.g., in a pocket or purse) without having to worry about obscuring the camera. In the illustrated example, the user is free to relax and watch his or her daughter's soccer game without having to hold and move mobile device 100, while detached mini-camera 150 properly records or live streams the soccer game and camera(s) 154 track the daughter. In addition, in the case of a live stream, contacts who have joined the sharing group for the live stream may also watch the soccer game on their own devices, without the user having to worry about the contacts having a negative viewing experience.

It should be understood that detachable mini-camera 150 may operate in the same manner, even when attached to mobile device 100 via socket 110. In this case, the mobile application will still control camera(s) 154 to rotate and/or otherwise move to track the object of interest, in the same manner as in the detached state, except, in an embodiment, using non-wireless communications. However, because the orientation of attached mini-camera 150 will depend on the orientation of mobile device 100, the user will need to maintain mobile device 100 in a proper orientation to ensure proper video recording or live streaming and object tracking.

2.5. Editing

Figures 4G, 4H:
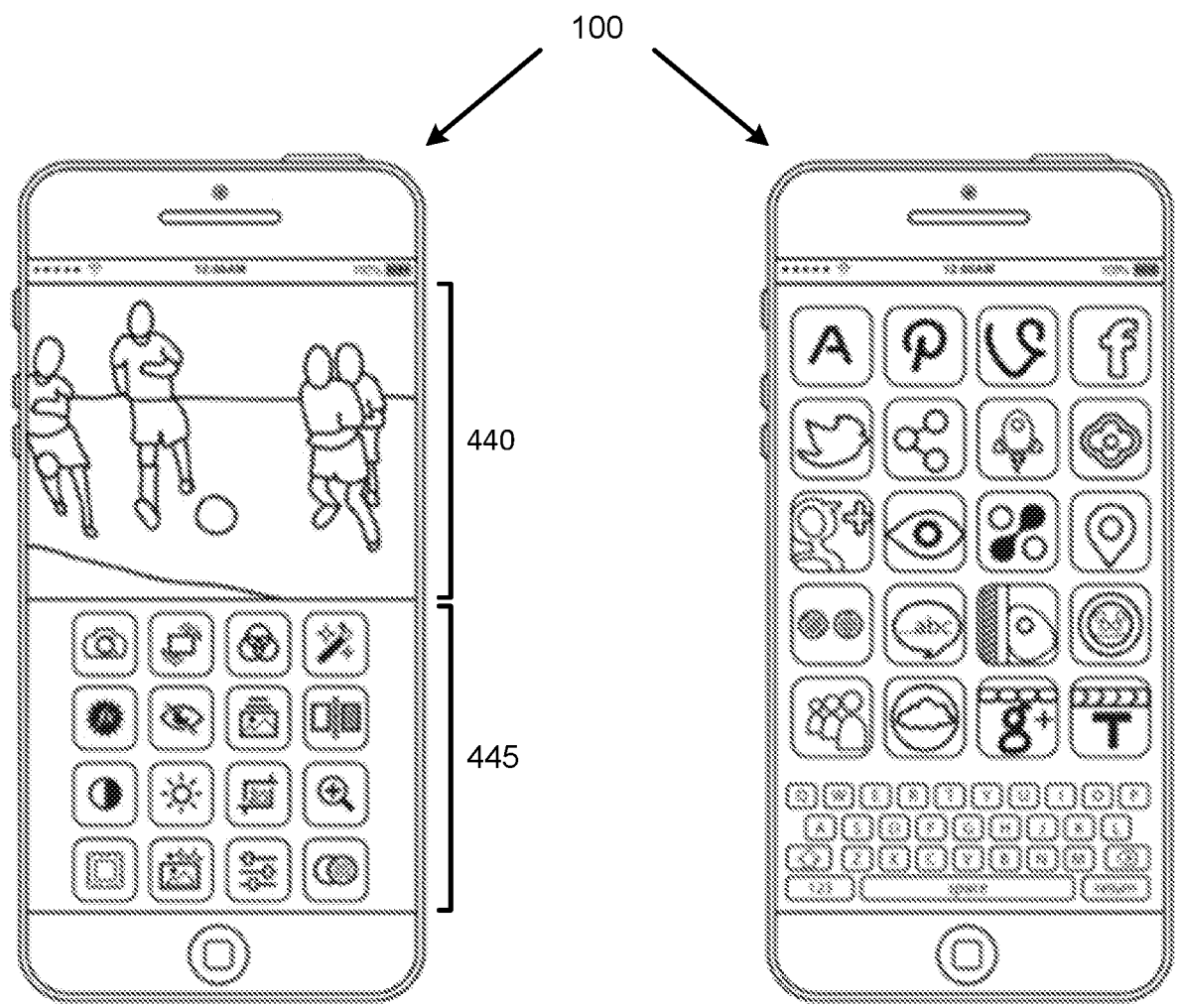

FIG. 4G illustrates an editing screen of graphical user interface 400 of the mobile application, according to an embodiment. The editing screen may be displayed when a user selects an input for performing editing in the main screen or other screen of graphical user interface 400. As illustrated, the editing screen comprises a viewing region 440 for viewing a real-time field of view of detachable mini-camera 150 and/or a stored photograph or video recording. In addition, the editing screen comprises an input region 445 for selecting one or more of a plurality of selectable editing options. The plurality of selectable editing options may comprise standard image-processing functions to be performed on the image data in viewing region 440, such as flipping or rotating the image data, removing red eye in the image data, modifying a contrast in the image data, modifying a brightness of the image data, cropping the image data, converting the image data between color and black-and-white, applying one or more filters to the image data, and/or the like. The user may be provided with editing options that are available via one or both of the mobile application and the manufacturer of mobile device 100.

2.6. Sharing

FIG. 4H illustrates a sharing screen of graphical user interface 400 of the mobile application, according to an embodiment. The sharing screen may be displayed when a user selects an input for specifying settings in the main screen or other screen of graphical user interface 400. As illustrated, the sharing screen comprises a plurality of selectable representations of sharing platforms (e.g., social media platforms, such as Facebook™ Google+™ Twitter™, etc.). The user may select one or more of the sharing platforms to be used, for example, when live streaming the image data from detachable mini-camera 150. Thus, the user can preselect the platform to be used during subsequent live streaming or when otherwise sharing image data.

2.7. Detachment Alert

In an embodiment, the mobile application detects and alerts the user when detachable mini-camera 150 is detached from mobile device 100. For example, socket 110 may comprise a mechanical, magnetic, or electrical detection sensor to detect whether or not detachable mini-camera 150 is currently inserted in socket 110. The mobile application or other software or hardware in mobile device 100 may set a flag whenever the detection sensor indicates that detachable mini-camera 150 is detached, and the mobile application may provide an alert whenever the flag indicates that detachable mini-camera 150 is detached. The alert may comprise a visual indication (e.g., a graphical element on a display of mobile device 100, a flashing or lit light-emitting diode (LED) of mobile device 100, etc.), an audio alert (e.g., by a speaker of mobile device 100), a vibration of mobile device 100 (e.g., by a piezoelectric element within the main body of mobile device 100), and/or the like.

For example, whenever and for as long as detachable mini-camera 150 is detached from mobile device 100, the top, bottom, or corner of graphical user interface 400 may comprise a graphical element which indicates that detachable mini-camera 150 is detached. Alternatively or additionally, whenever and for as long as detachable mini-camera 150 is detached from mobile device 100, a LED in mobile device 100 may stay lit or flash at predetermined intervals (e.g., every few seconds).

Additionally or alternatively, whenever and for as long as detachable mini-camera 150 is detached from mobile device 100, the mobile application may determine or estimate a distance between detached mini-camera 150 and mobile device 100. For example, the mobile application could estimate the distance based on a signal strength (e.g., received signal strength indication (RSSI)) of the wireless signal received from detached mini-camera 15, with stronger signal strengths indicative of a closer distance and weaker signal strengths indicative of a farther distance. Alternatively, detached mini-camera 150 may comprise a GPS receiver (e.g., comprising flex cable antenna 362) and may wirelessly transmit its GPS location, obtained via the GPS receiver, to the mobile application at predetermined intervals. In this case, the mobile application may acquire the GPS location of mobile device 100 (e.g., via a GPS receiver in mobile device 100) and calculate the distance between the GPS location of detached mini-camera 150 and the GPS location of mobile device 100. Regardless of how the distance between detached mini-camera 150 and mobile device 100 is determined or estimated, the mobile application may activate an alert whenever the distance exceeds a predetermined threshold, indicating that the distance is approaching the maximum limit of the wireless communication range (e.g., 50 feet) supported by the wireless technology being used by transceiver 360. While the distance is below the predetermined threshold, the mobile application does not activate the alert. In an embodiment, the alert may be visual, auditory, and/or vibratory and designed to be very likely to attract the user's attention. For example, the alert may comprise flashing a bright light using an LED and/or other light source of mobile device 100, outputting a shrill sound from a speaker of mobile device 100, strongly vibrating the housing of mobile device 100, and/or the like. The alert may also comprise displaying a prominent prompt, on the display of mobile device 100 (e.g., within graphical user interface 400), that requests the user to reattach detached mini-camera 150 to mobile device 100.

In an embodiment, multiple levels of alerts may be used. For example, when detachable mini-camera 150 is in the detached state, the mobile application may display a non-obtrusive visual indication within graphical user interface 400. If the distance between detached mini-camera 150 and mobile device 100 reaches a first predetermined threshold, the mobile application may provide a less obtrusive visual indication and/or a weak auditory and/or vibratory alert. Then, if the distance between detached mini-camera 150 and mobile device 100 reaches a second predetermined threshold, that is greater than the first predetermined threshold, the mobile application may prominently warn the user (e.g., by prompting the user to reattach detached mini-camera 150) within graphical user interface 400 (e.g., by using the entire graphical user interface 400 for the prompt) and/or provide a strong auditory and/or vibratory alert. Advantageously, this minimizes the likelihood that a user will forget about and lose detached mini-camera 150, while also minimizing the annoyance to the user.

2.8. GPS Locator

In an embodiment, the mobile application comprises a GPS tracking function for locating a detached mini-camera 150 (e.g., if it is lost). For example, detached mini-camera 150 may comprise a GPS receiver (e.g., comprising flex cable antenna 362) and may wirelessly transmit its GPS location, obtained via the GPS receiver, to the mobile application at predetermined intervals. The mobile application may store the most recent GPS location or a rolling window of a predetermined number (e.g., ten) of the most recent GPS locations reported by detached mini-camera 150. Thus, even if detached mini-camera 150 is outside the range of wireless communication, the mobile application can utilize the most recent known location of detached mini-camera 150 to guide the user to detached mini-camera 150. Advantageously, this minimizes the likelihood that detached mini-camera 150 will be permanently lost.

Specifically, if the user has lost detached mini-camera 150, the user may navigate to a GPS-tracking screen within graphical user interface 400 of the mobile application. The GPS-tracking screen may comprise a virtual map of a vicinity of mobile device 100. The mobile application may acquire the current GPS location of mobile device 100 (e.g., via a GPS receiver in mobile device 100) and mark the current GPS location of mobile device 100 on the virtual map. In addition, the mobile application may retrieve the most recent known GPS location of detached mini-camera 150 from memory and mark the most recent known GPS location of detached mini-camera 150 on the virtual map. The GPS-tracking screen may also comprise directions to guide the user from the current location of mobile device 100 to the most recent known location of detached mini-camera 150.

If detached mini-camera 150 is stationary, it should still be at its most recent known location. However, if detached mini-camera 150 is not stationary, it may no longer be at the most recent known location. However, the most recent known location at least provides a starting point for locating detached mini-camera 150. For example, it may be that detached mini-camera 150 is still nearby the most recent known location. In this case, when the user brings mobile device 100 to the most recent known location, if detached mini-camera 150 is close enough to be within wireless communication range with mobile device 100 and assuming that transceiver 360 is still being powered (e.g., by rechargeable battery 350), the mobile application should receive an updated GPS location from transceiver 360. The mobile application may then update the most recent known GPS location of detached mini-camera 150 on the virtual map in the GPS-tracking screen and/or update the directions, to guide the user to the updated GPS location.

3. Example Usage

One example usage of detachable mini-camera 150 and the associated mobile application will now be described. The described example is simply one illustration of how a typical user might utilize the disclosed embodiments for a specific purpose, and should not be considered limiting in any manner.

The user may start by detaching detachable mini-camera 150 from mobile device 100, for example, by sliding detachable mini-camera 150 out of socket 110. The user may fasten detached mini-camera 150 to the user's person, for example, by clipping it to the user's shirt, hat, or sunglasses. In an embodiment, when detached from mobile device 100, detachable mini-camera 150 may seamlessly (i.e., without interruption) transition from being powered by the battery of mobile device 100 to being powered by rechargeable battery 350. Furthermore, in response to being detached from mobile device 100, detached mini-camera 150 may automatically activate and power up transceiver 360 to begin wirelessly communicating with mobile device 100.

The user may also activate the mobile application. For example, the user may select an icon associated with the mobile application within a graphical user interface of mobile device 100 to execute the mobile application in the foreground of mobile device 100. When first activated, the mobile application may display a main screen (e.g., the main screen illustrated in FIG. 4A). Once activated, the user can navigate through one or more screens of the mobile application to control detached mini-camera 150 and/or specify settings for detached mini-camera 150. As discussed elsewhere herein, the mobile application may perform the alert function to prevent detached mini-camera 150 from being lost.

If the user wishes to take a photograph, the user may navigate to a photograph screen (e.g., the photograph screen illustrated in FIG. 4B) to transition the mobile application to a photography mode. The user may utilize inputs within the photograph screen to zoom in, zoom out, rotate a photographic camera 154 in detached mini-camera 150 (e.g., left, right, up, and/or down), and/or specify other settings. In response to these inputs, the mobile application wirelessly transmits one or more control commands to detached mini-camera 150, and, in response to receiving the control command(s), detached mini-camera 150 adjusts the components of detached mini-camera 150 (e.g., camera 154, flash 158, etc.) according to the control command(s). Once the user has specified all the desired settings, the user may select an input for capturing a photograph. In response to this input, the mobile application wirelessly transmits a control command for capturing a photograph to detached mini-camera 150, and, in response to receiving the control command, detached mini-camera 150 captures the photograph, and wirelessly transmits the photograph to the mobile application. Upon receiving the photograph from detached mini-camera 150, the mobile application may display the photograph on a display of mobile device 100 and/or save the photograph to a memory of mobile device 100 (e.g., in association with a gallery or camera roll).

As another example, if the user wishes to record a video, the user may navigate to a video screen (e.g., the video screen illustrated in FIG. 4C) to transition the mobile application to a video mode. The user may select an input within the video screen for starting a video recording. In response to this input, the mobile application wirelessly transmits a control command for starting the video recording to detached mini-camera 150, and, in response to receiving the control command, detached mini-camera 150 begins capturing image frames and wirelessly transmitting those image frames to mobile application, which accumulates each received image frame in a memory of mobile device 100. Once the user has decided to end the video recording, the user may select an input for ending the video recording (e.g., the same input that was used to start the video recording). In response to this input, the mobile application wirelessly transmits a control command for ending the video recording to detached mini-camera 150, and, in response to receiving the control command, detached mini-camera 150 stops capturing image frames while wirelessly transmitting any previously untransmitted image frames to mobile application. Once all image frames have been received or as the image frames are received, the mobile application saves the accumulated image frames as a video file in the memory of mobile device 100 (e.g., in association with a gallery or camera roll). Before or during the video recording, the user may utilize inputs within the video screen to zoom in, zoom out, rotate a video camera 154 in detached mini-camera 150 (e.g., left, right, up, and/or down), and/or specify other settings. In response to these inputs, the mobile application wirelessly transmits one or more control commands to detached mini-camera 150, and, in response to receiving the control command(s), detached mini-camera 150 adjusts the components of detached mini-camera 150 (e.g., camera 154) according to the control command(s).

As yet another example, if the user wishes to live stream, the user may navigate to a live-stream screen (e.g., the live-stream screen illustrated in FIG. 4D) to transition the mobile application to a live-stream mode. The user may select an input within the live-stream screen for starting a live stream. In response to this input, the mobile application wirelessly transmits a control command for starting the live stream to detached mini-camera 150, and, in response to receiving the control command, detached mini-camera 150 begins capturing image frames and wirelessly transmitting those image frames to mobile application, which relays the image frames (e.g., with or without intermediate processing) to another device or sharing platform (e.g., social media platform). Once the user has decided to end the live stream, the user may select an input for ending the live stream (e.g., the same input that was used to start the live stream). In response to this input, the mobile application wirelessly transmits a control command for ending the live stream to detached mini-camera 150, and, in response to receiving the control command, detached mini-camera 150 stops capturing image frames. Before or during the live stream, the user may utilize inputs within the live-stream screen to zoom in, zoom out, rotate a video camera 154 in detached mini-camera 150 (e.g., left, right, up, and/or down), and/or specify other settings. In response to these inputs, the mobile application wirelessly transmits one or more control commands to detached mini-camera 150, and, in response to receiving the control command(s), detached mini-camera 150 adjusts the components of detached mini-camera 150 (e.g., camera 154) according to the control command(s).

Prior to or during the live stream, the user may also create a new group of contacts (e.g., via the grouping screen illustrated in FIG. 4E) or specify an existing group of contacts (e.g., via the grouping screen illustrated in FIG. 4E or via an input in the live-stream screen) to be invited to view the live stream. If a group is selected, the mobile application may send an invitation (e.g., SMS or MMS message) to each contact in the group with a link (e.g., hyperlink) to the resource, associated with the live stream, on a sharing platform (e.g., a social media platform) or other information for joining the live stream. Contacts who select the link or otherwise accept the invitation may view the live stream via the sharing platform (e.g., using their credentials to log in to their respective user accounts on the sharing platform if the live stream is private, or without authentication if the live stream is public).

If the user wishes to use the object tracking function of the mobile application (e.g., to track a person of interest in a video recording or live stream), the user may navigate to an object-identification screen (e.g., the object-identification screen illustrated on the left side in FIG. 4F). The user may select an input within the capture screen to select or capture a photograph of the object of interest, and identify the object of interest within the photograph. In response to the identification of the object of interest, the mobile application will generate a reference feature vector to be used for tracking the object of interest. The user may then (contemporaneously or at some much later time) navigate to the video screen (e.g., the video screen illustrated in FIG. 4C) or the live-stream screen (e.g., the live-stream screen illustrated in FIG. 4D) and begin a video recording or live stream, as discussed above. During the video recording or live stream, the mobile application will compare features in the captured image frames to the reference feature vector to recognize the object of interest within the captured image frames, and control detached mini-camera 150 to rotate and/or otherwise move camera 154 (e.g., left or right, up or down, etc.) to maintain the object of interest within a vicinity of the center of subsequent image frames. In this manner, the user can simply detach mini-camera 150 from mobile device 100 and fasten the detached mini-camera 150 to another object or set the detached mini-camera 150 on another object, such that the user can watch the action live without having to hold and position mobile device 100.

As a concrete example, a user may wish to live-stream his daughter's soccer game to the daughter's grandparents who reside in a different state and the daughter's mother who is out of town for a business meeting, and therefore, are unable to attend the soccer game in person. However, the user also wishes to relax and enjoy his daughter's soccer game. Using a mobile device 100 with the detachable mini-camera 150 and the mobile application of disclosed embodiments, the user is able to achieve both objectives. Specifically, the user may use the mobile application to create or select a group of contacts (e.g., using the grouping screen illustrated in FIG. 4E) that consists of the daughter's mother and grandparents (e.g., identified by their respective telephone numbers). The mobile application will send invitations to the daughter's mother and grandparents which provide each of them with a hyperlink to a social networking platform, selected by the user (e.g., using the sharing screen illustrated in FIG. 4H), and a resource through which the soccer game will be live streamed. The user may also use the mobile application to capture a photograph of his daughter prior to the game and identify his daughter's face in the photograph to the mobile application for object tracking (e.g., using the object-identification screen illustrated on the left side in FIG. 4F). The user may detach detachable mini-camera 150 from his mobile device 100, fasten detached mini-camera 150 to his shirt or hat, and use the mobile application to begin a live stream (e.g., using the live-stream screen illustrated in FIG. 4D). Afterwards, the user may store mobile device 100 in his pocket and watch the game live without having to worry about mobile device 100, detached mini-camera 150, and the mobile application. The mobile application will wirelessly communicate with detached mini-camera to control camera 154 in detached mini-camera 150, while detached mini-camera 150 is clipped to the user's shirt or hat, to track the daughter on the soccer field, and relay the image data, captured by camera 154 and representing the live stream, to the social networking platform selected by the user, in real time. The social networking platform will, in turn, provide the live stream to the daughter's grandparents and mother.

If the user wishes to edit a photograph, video recording, or live stream, before, during, or after capture, the user may navigate to an editing screen (e.g., the editing screen illustrated in FIG. 4G). The user may select one or more inputs associated with editing options, such as filters, effects, settings (e.g., brightness, exposure, etc.), and/or the like, to easily apply image processing to the photograph or to the image frames of the video recording or live stream.

4. Example Processing Device

Figure 5:
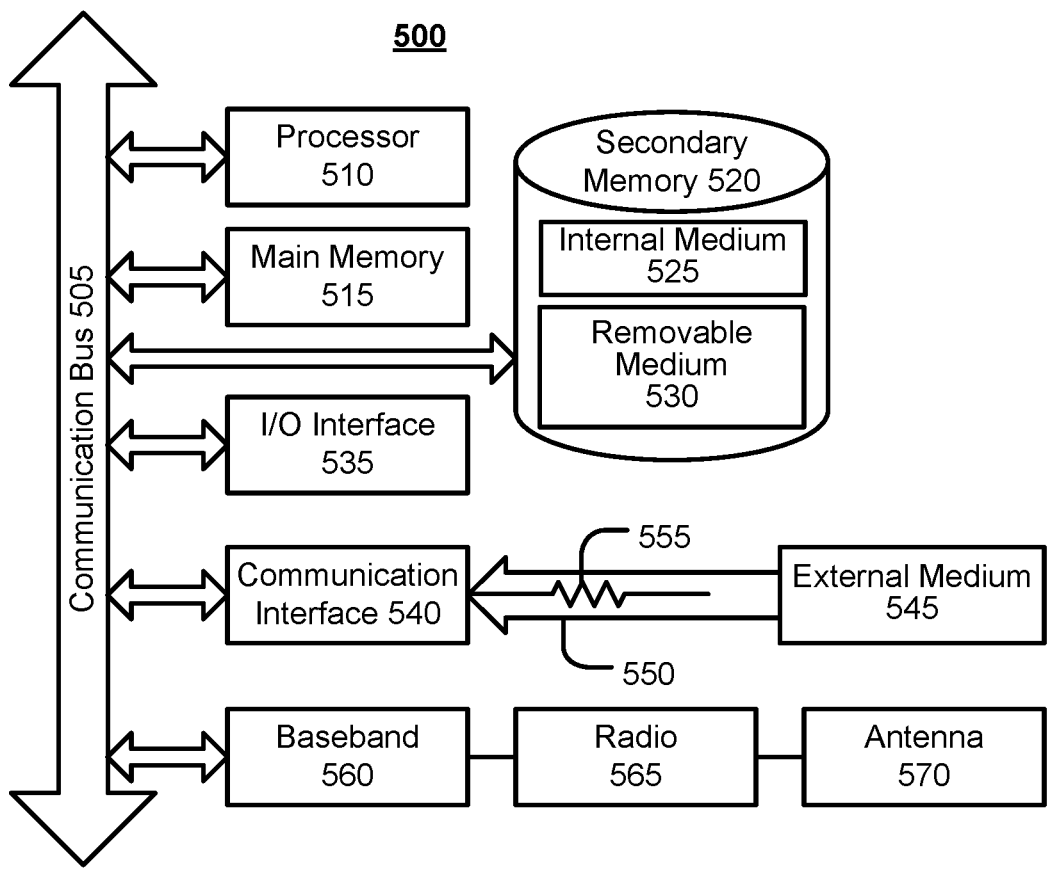
FIG. 5 illustrates an example processing system, by which one or more of the processes described herein (e.g., implemented by the mobile application), may be executed, according to an embodiment.

FIG. 5 is a block diagram illustrating an example wired or wireless system 500 that may be used in connection with various embodiments described herein. For example, system 500 may be used as or in conjunction with one or more of the functions, processes, or methods (e.g., to store and/or execute the mobile application or one or more software modules of the mobile application) described herein, and may represent components of mobile device 100, detachable mini-camera 150, and/or other processing devices described herein. System 500 can be a smartphone, a controller for detachable mini-camera 150, or any other processor-enabled device that is capable of wired or wireless data communication. Other computing systems and/or architectures may be also used, as will be clear to those skilled in the art.

System 500 preferably includes one or more processors, such as processor 510. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 510. Examples of processors which may be used with system 500 include, without limitation, the Pentium® processor, Core i7® processor, and Xeon® processor, all of which are available from Intel Corporation of Santa Clara, Calif.

Processor 510 is preferably connected to a communication bus 505. Communication bus 505 may include a data channel for facilitating information transfer between storage and other peripheral components of system 500. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 500 preferably includes a main memory 515 and may also include a secondary memory 520. Main memory 515 provides storage of instructions and data for programs executing on processor 510, such as one or more of the functions and/or modules discussed herein. It should be understood that programs stored in the memory and executed by processor 510 may be written and/or compiled according to any suitable language, including without limitation C/C++, Java, JavaScript, Perl, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 520 may optionally include an internal medium 525 and/or a removable medium 530. Removable medium 530 is read from and/or written to in any well-known manner. Removable storage medium 530 may be, for example, a magnetic tape drive, a compact disc (CD) drive, a digital versatile disc (DVD) drive, other optical drive, a flash memory drive, and/or the like.

Secondary memory 520 is a non-transitory computer-readable medium having computer-executable code (e.g., disclosed software modules) and/or other data stored thereon. The computer software or data stored on secondary memory 520 is read into main memory 515 for execution by processor 510.

In alternative embodiments, secondary memory 520 may include other similar means for allowing computer programs or other data or instructions to be loaded into system 500. Such means may include, for example, a communication interface 540, which allows software and data to be transferred from external storage medium 545 to system 500. Examples of external storage medium 545 may include an external hard disk drive, an external optical drive, an external magneto-optical drive, and/or the like. Other examples of secondary memory 520 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 500 may include a communication interface 540. Communication interface 540 allows software and data to be transferred between system 500 and external devices (e.g. printers), networks, or other information sources. For example, computer software or executable code may be transferred to system 500 from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 500 with a network or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 540 are generally in the form of electrical communication signals 555. These signals 555 may be provided to communication interface 540 via a communication channel 550. In an embodiment, communication channel 550 may be a wired or wireless network, or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed mobile application, or software modules) is stored in main memory 515 and/or secondary memory 520. Computer programs can also be received via communication interface 540 and stored in main memory 515 and/or secondary memory 520. Such computer programs, when executed, enable system 500 to perform the various functions of the disclosed embodiments as described elsewhere herein.

In this description, the term "computer-readable medium" is used to refer to any non-transitory computer-readable storage media used to provide computer-executable code and/or other data to or within system 500. Examples of such media include main memory 515, secondary memory 520 (including internal memory 525, removable medium 530, and external storage medium 545), and any peripheral device communicatively coupled with communication interface 540 (including a network information server or other network device). These non-transitory computer-readable media are means for providing executable code, programming instructions, software, and/or other data to system 500.

In an embodiment that is implemented using software, the software may be stored on a computer-readable medium and loaded into system 500 by way of removable medium 530, I/O interface 535, or communication interface 540. In such an embodiment, the software is loaded into system 500 in the form of electrical communication signals 555. The software, when executed by processor 510, preferably causes processor 510 to perform one or more of the processes and functions described elsewhere herein.

In an embodiment, I/O interface 535 provides an interface between one or more components of system 500 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 500 may also include optional wireless communication components that facilitate wireless communication over a voice network and/or a data network (e.g., in the case of mobile device 100). The wireless communication components comprise an antenna system 570, a radio system 565, and a baseband system 560. In system 500, radio frequency (RF) signals are transmitted and received over the air by antenna system 570 under the management of radio system 565.

In an embodiment, antenna system 570 may comprise one or more antennae and one or more multiplexors (not shown) that perform a switching function to provide antenna system 570 with transmit and receive signal paths. In the receive path, received RF signals can be coupled from a multiplexor to a low noise amplifier (not shown) that amplifies the received RF signal and sends the amplified signal to radio system 565.

In an alternative embodiment, radio system 565 may comprise one or more radios that are configured to communicate over various frequencies. In an embodiment, radio system 565 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 565 to baseband system 560.

If the received signal contains audio information, then baseband system 560 decodes the signal and converts it to an analog signal. Then the signal is amplified and sent to a speaker. Baseband system 560 also receives analog audio signals from a microphone. These analog audio signals are converted to digital signals and encoded by baseband system 560. Baseband system 560 also encodes the digital signals for transmission and generates a baseband transmit audio signal that is routed to the modulator portion of radio system 565. The modulator mixes the baseband transmit audio signal with an RF carrier signal, generating an RF transmit signal that is routed to antenna system 570 and may pass through a power amplifier (not shown). The power amplifier amplifies the RF transmit signal and routes it to antenna system 570, where the signal is switched to the antenna port for transmission.

Baseband system 560 is also communicatively coupled with processor 510, which may be a central processing unit (CPU). Processor 510 has access to data storage areas 515 and 520. Processor 510 is preferably configured to execute instructions (i.e., computer programs, such as the disclosed application, or software modules) that can be stored in main memory 515 or secondary memory 520. Computer programs can also be received from baseband processor 560 and stored in main memory 510 or in secondary memory 520, or executed upon receipt. Such computer programs, when executed, enable system 500 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A mobile device comprising:
   a main body comprising
     a battery,
     a first wireless transceiver,
     a socket,
     at least one hardware processor,
     a memory, and
     a mobile application stored in the memory; and
   a detachable mini-camera configured to attach to the socket and detach from the socket, wherein the detachable mini-camera comprises
     two or more separate cameras,
     a rechargeable battery configured to charge from the battery in the main body when the detachable mini-camera is attached to the socket, and
     a second wireless transceiver configured to wirelessly communicate with the first wireless transceiver in the main body when the detachable mini-camera is detached from the socket;
   at least one of the two or more cameras comprises:
   a mini-camera device; and
     at least one motor powered by the rechargeable battery in the detachable mini-camera and configured to move the mini-camera device;
   wherein the mobile application is configured to, when executed by the at least one hardware processor in the main body, when the detachable mini-camera is detached from the socket, wirelessly communicate with the detachable mini-camera, via the first and second wireless transceivers, to control the detachable mini-camera and receive image data captured by the detachable mini-camera; generate a graphical user interface that comprises one or more inputs for moving the mini-camera device; and, in response to receiving a user operation of at least one of the one or more inputs, transmit a control command from the first wireless transceiver in the main body to the second wireless transceiver in the detachable mini-camera, so as to actuate the at least one motor to move the mini-camera device in accordance with the control command.

2. The mobile device of claim 1, wherein the detachable mini-camera further comprises at least one sensor and at least one flash.

3. The mobile device of claim 1, wherein the at least one camera consists of a single camera configured to capture photographs and video.

4. The mobile device of claim 1, wherein the two or more cameras comprise a first camera dedicated to capturing photographs, and a second camera dedicated to capturing video, comprising a plurality of image frames.

5. The mobile device of claim 1, wherein the mobile application is further configured to:
   generate a graphical user interface that comprises one or more inputs for specifying an object in a photograph; and,
   when an object is specified,
     generate a reference representation of the object, and
     during a subsequent video recording or live stream in which the mobile application receives a plurality of image frames from the detachable mini-camera,
       detect the object in one or more of the plurality of image frames, and, in response to detecting the object, transmit a control command from the first wireless transceiver in the main body to the second wireless transceiver in the detachable mini-camera, so as to actuate the at least one motor to move the mini-camera device to track the object.

6. The mobile device of claim 1, wherein the main body further comprises:
   a front surface comprising a touch panel display; and
   a rear surface comprising the socket, wherein the rear surface is on an opposite side of the main body as the front surface.

7. The mobile device of claim 1, wherein the main body further comprises a front surface comprising a touch panel display and the socket.

8. The mobile device of claim 1, wherein the socket comprises one or more electrical traces, and wherein the detachable mini-camera comprises one or more corresponding electrical traces that contact the one or more electrical traces of the socket when the detachable mini-camera is attached to the socket, to thereby conductively couple the detachable mini-camera to the socket.

9. The mobile device of claim 1, wherein, when the detachable mini-camera is attached to the socket, the detachable mini-camera communicates with the main body via a direct electrical connection within the socket, instead of wireless communication between the first and second wireless transceivers.

10. The mobile device of claim 1, wherein the detachable mini-camera further comprises a fastener that is configured to attach to at least one external object other than the socket.

11. A mobile device comprising:
   a main body comprising
      a battery,
      a first wireless transceiver,
      a socket,
      at least one hardware processor,
      a memory, and
      a mobile application stored in the memory; and
   a detachable mini-camera configured to attach to the socket and detach from the socket, wherein the detachable mini-camera comprises
      two or more separate cameras,
      a rechargeable battery configured to charge from the battery in the main body when the detachable mini-camera is attached to the socket, and
      a second wireless transceiver configured to wirelessly communicate with the first wireless transceiver in the main body when the detachable mini-camera is detached from the socket;
   wherein the mobile application is configured to, when executed by the at least one hardware processor in the main body, when the detachable mini-camera is detached from the socket, wirelessly communicate with the detachable mini-camera, via the first and second wireless transceivers, to control the detachable mini-camera and receive image data captured by the detachable mini-camera; generate a graphical user interface that comprises a real-time-view region and at least one input for one or more of capturing a photograph, initiating a video recording, and initiating a live stream, wherein the real-time-view region comprises real-time image data captured by the detachable mini-camera and wirelessly transmitted from the second wireless transceiver in the detachable mini-camera to the first wireless transceiver in the main body; and, in response to receiving a user operation of the at least one input, transmit a control command from the first wireless transceiver in the main body to the second wireless transceiver in the detachable mini-camera, so as to actuate at least one of the two or more cameras in the detachable mini-camera according to the control command.

12. The mobile device of claim 11, wherein the mobile application is configured to, when the user operation of the at least one input is to capture a photograph:
   generate the control command to capture the photograph;
   receive the photograph from the detachable mini-camera via a wireless communication from the second wireless transceiver to the first wireless transceiver; and
   store the received photograph in the memory in the main body.

13. The mobile device of claim 11, wherein the mobile application is configured to, when the user operation of the at least one input is to initiate a video recording:
   generate the control command to initiate the video recording;
   during the video recording, receive a plurality of image frames from the detachable mini-camera via a wireless communication from the second wireless transceiver to the first wireless transceiver; and
   store the received plurality of image frames in the memory in the main body as a video file.

14. The mobile device of claim 11, wherein the mobile application is configured to, when the user operation of the at least one input is to initiate a live stream:
   generate the control command to initiate the live stream; and,
   during the live stream,
      receive a plurality of image frames from the detachable mini-camera via a wireless communication from the second wireless transceiver to the first wireless transceiver, and
      relay the plurality of image frames to a sharing platform via at least one wireless cellular network.

15. The mobile device of claim 14, wherein the mobile application is further configured to:
   generate a graphical user interface that comprises one or more inputs for identifying a group of one or more contacts; and,
   for each of the one or more contacts in the group, transmit an invitation to the contact, wherein the invitation comprises information for viewing the live stream.

16. The mobile device of claim 14, wherein the mobile application is further configured to generate a graphical user interface that comprises one or more inputs configured to receive a user selection of the sharing platform.

17. A mobile device comprising:
   a main body comprising
      a battery,
      a first wireless transceiver,
      a socket,
      at least one hardware processor,
      a memory, and
      a mobile application stored in the memory; and
   a detachable mini-camera configured to attach to the socket and detach from the socket, wherein the detachable mini-camera comprises
      two or more separate cameras,
      a rechargeable battery configured to charge from the battery in the main body when the detachable mini-camera is attached to the socket, and
      a second wireless transceiver configured to wirelessly communicate with the first wireless transceiver in the main body when the detachable mini-camera is detached from the socket;
wherein the mobile application is configured to, when executed by the at least one hardware processor in the main body, when the detachable mini-camera is detached from the socket, wirelessly communicate with the detachable mini-camera, via the first and second wireless transceivers, to control the detachable mini-camera and receive image data captured by the detachable mini-camera,
wherein, when the detachable mini-camera is attached to the socket, the detachable mini-camera continues to communicate with the main body via wireless communication between the first and second wireless transceivers.

18. A mobile device comprising:
a main body comprising
    a battery,
    a first wireless transceiver,
    a socket,
    at least one hardware processor,
    a memory, and
    a mobile application stored in the memory; and
a detachable mini-camera configured to attach to the socket and detach from the socket, wherein the detachable mini-camera comprises
    two or more separate cameras,
    a rechargeable battery configured to charge from the battery in the main body when the detachable mini-camera is attached to the socket, and
    a second wireless transceiver configured to wirelessly communicate with the first wireless transceiver in the main body when the detachable mini-camera is detached from the socket;
wherein the mobile application is configured to, when executed by the at least one hardware processor in the main body, when the detachable mini-camera is detached from the socket, wirelessly communicate with the detachable mini-camera, via the first and second wireless transceivers, to control the detachable mini-camera and receive image data captured by the detachable mini-camera,
wherein the mobile application provides an indication for as long as the detachable mini-camera is detached from the socket, and, when the detachable mini-camera is detached from the socket, initiates an alert in response to a distance between the detachable mini-camera and the main body exceeding a predetermined threshold.

\* \* \* \* \*